(12) United States Patent
Yamaguchi et al.

(10) Patent No.: US 10,735,606 B2
(45) Date of Patent: Aug. 4, 2020

(54) DISPLAY DEVICE, IMAGE PROCESSING DEVICE AND NON-TRANSITORY RECORDING MEDIUM DETERMINING CONTINUITY OF OPERATION TWO OR MORE DISPLAY AREAS

(71) Applicant: KONICA MINOLTA, INC., Chiyoda-ku, Tokyo (JP)

(72) Inventors: Tomohiro Yamaguchi, Shinshiro (JP); Takuto Matsumoto, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/223,268

(22) Filed: Dec. 18, 2018

(65) Prior Publication Data

US 2019/0191042 A1   Jun. 20, 2019

(30) Foreign Application Priority Data

Dec. 20, 2017   (JP) .................................. 2017-243456

(51) Int. Cl.
*H04N 1/00*     (2006.01)
*G06F 3/0488*   (2013.01)
*G06F 3/0485*   (2013.01)

(52) U.S. Cl.
CPC ..... *H04N 1/00411* (2013.01); *G06F 3/04883* (2013.01); *H04N 1/00482* (2013.01);
(Continued)

(58) Field of Classification Search
None
See application file for complete search history.

(56) References Cited

U.S. PATENT DOCUMENTS 8,692,789 B2 * 4/2014 Chen ................... G06F 3/04883
                                                345/173
2009/0322689 A1 * 12/2009 Kwong ............... G06F 3/04883
                                                345/173
(Continued)

FOREIGN PATENT DOCUMENTS

CN   101866263 A    10/2010
CN   103384862 A    11/2013
(Continued)

OTHER PUBLICATIONS

First Office Action dated Feb. 6, 2020, by the Chinese Patent Office in corresponding Chinese Patent Application No. 201811538605.0, and an English Translation of the Office Action. (19 pages).

*Primary Examiner* — Miya J Williams
(74) *Attorney, Agent, or Firm* — Buchanan Ingersoll & Rooney PC

(57) ABSTRACT

A display device, comprises: a display part that displays a first display area and a second display area across a boundary and displays operation screens in the respective first and second display areas; a manipulation part that detects a user operation performed to a display screen of the display part; and a hardware processor that: determines whether or not a first operation and a second operation have continuity when the second operation is detected in the second display area after the first operation is detected in the first display area; and updates the operation screen in the first display area in response to the second operation when the first operation and the second operation are determined to have continuity, and updates the operation screen in the second display area in response to the second operation when the first operation and the second operation are determined not to have continuity.

23 Claims, 26 Drawing Sheets

(52) U.S. Cl.
CPC ........ *G06F 3/0485* (2013.01); *G06F 3/04886* (2013.01); *G06F 2203/04803* (2013.01); *G06F 2203/04808* (2013.01)

(56) References Cited

U.S. PATENT DOCUMENTS

| | | | | |
|---|---|---|---|---|
| 2010/0309158 | A1* | 12/2010 | Iwayama | G06F 1/1643 |
| | | | | 345/173 |
| 2011/0018821 | A1* | 1/2011 | Kii | G06F 1/1616 |
| | | | | 345/173 |
| 2011/0154267 | A1* | 6/2011 | Nurmi | G06F 3/04883 |
| | | | | 715/863 |
| 2013/0159942 | A1* | 6/2013 | Mizunuma | H04W 4/21 |
| | | | | 715/863 |
| 2013/0222276 | A1* | 8/2013 | Kim | G06F 3/0488 |
| | | | | 345/173 |
| 2013/0335359 | A1* | 12/2013 | Shima | G06F 1/1616 |
| | | | | 345/173 |

FOREIGN PATENT DOCUMENTS

| | | |
|---|---|---|
| JP | 2015018432 A | 1/2015 |
| JP | 2017027422 A | 2/2017 |

\* cited by examiner

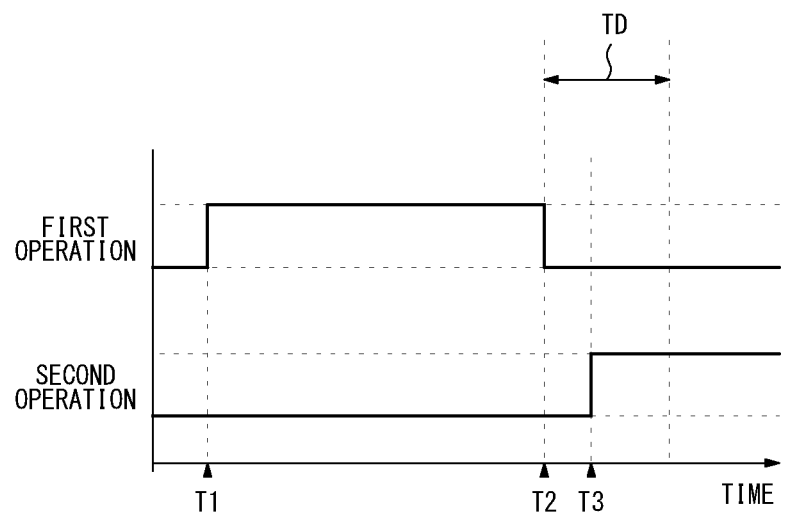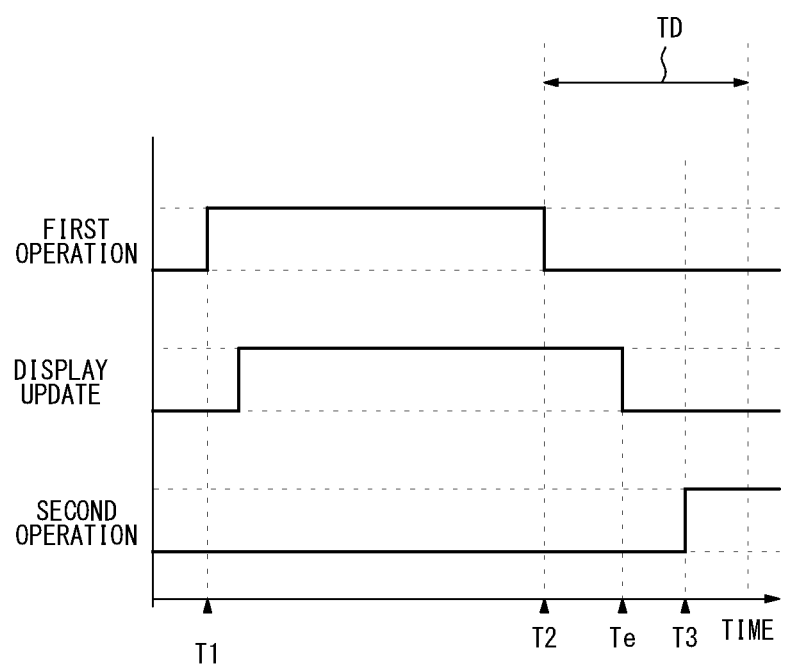

DISPLAY DEVICE, IMAGE PROCESSING DEVICE AND NON-TRANSITORY RECORDING MEDIUM DETERMINING CONTINUITY OF OPERATION TWO OR MORE DISPLAY AREAS

Japanese patent application No. 2017-243456 filed on Dec. 20, 2017 including description, claims, drawings, and abstract the entire disclosure is incorporated herein by reference in its entirety.

BACKGROUND

Technological Field

The present invention relates to a display device, an image processing device and a non-transitory recording medium. The present invention more specifically relates to a technique for detecting user operation and performing screen update in a manner where a display area of the display device is divided into a first display area and a second display area across a boundary.

Description of the Related Art

Display devices capable of detecting multi-touch performed by users have become increasingly more popular. This type of the display device is enabled to divide a single display area into multiple display areas across boundaries and display operation screens in the respective multiple display areas.

The aforementioned conventional display device may detect two fingers of the user in the first display area of the multiple display areas, and one of the fingers may move to the second display area. Even in such a case, the conventional display device determines it is a pinch operation to the operation screen displayed in the first display area, and enlarges or reduces the operation screen displayed in the first display area. This known technique is introduced for example in Japanese Patent Application Laid-Open No. JP 2017-27422 A. According to the known technique, when the touch operation is detected in each of the first display area and the second display area, the touch operations are determined to be separate operation performed to each of the first display area and the second display area.

If each of the touch operations is determined as the separate operation when the touch operation is detected in each of the first display area and the second display area as described in the known technique, the operation screen not intended by the user may be updated. The user may move the touched position of the touch operation in the horizontal direction in order to scroll the operation screen displayed in the first display area in the horizontal direction, for example. In such a case, the touched position, sometimes, enters the second display area across the boundary. The user then may start again the touch operation soon after he or she releases the finger from the screen, and move the touched position of the touch operation in an opposite direction from the previous moving direction to scroll the same operation screen in the opposite direction. The touch operation by the user is performed in the second display area. The operation screen displayed in the second display area is then scroll displayed, and the screen not intended by the user is updated. Moreover, according to the known technique, continuous operations performed to the same operation screen by the user may sometimes not be appropriately detected.

SUMMARY

The present invention is intended to solve the above problems. Thus, the present invention is intended to provide a display device, an image processing device and a non-transitory recording medium capable of appropriately detecting continuous operations performed to the same operation screen and updating the operation screen.

First, the present invention is directed to a display device.

To achieve at least one of the abovementioned objects, according to an aspect of the present invention, the display device reflecting one aspect of the present invention comprises: a display part that displays a first display area and a second display area across a boundary and displays operation screens in the respective first and second display areas; a manipulation part that detects a user operation performed to a display screen of the display part; and a hardware processor that: determines whether or not a first operation and a second operation have continuity when the second operation is detected in the second display area after the first operation is detected in the first display area by the manipulation part; and updates the operation screen in the first display area in response to the second operation when the first operation and the second operation are determined to have continuity, and updates the operation screen in the second display area in response to the second operation when the first operation and the second operation are determined not to have continuity.

Second, the present invention is directed to an image processing device.

To achieve at least one of the abovementioned objects, according to an aspect of the present invention, the image processing device reflecting one aspect of the present invention comprises: a display device according to claim 1; and a hardware processor that: outputs a job setting screen for configuring job settings to the display device, and displays in at least one of a first display area and a second display area; obtains operation information regarding an operation to the job setting screen from the display device and applies the job settings; and controls an execution of the job based on the job settings.

Third, the present invention is directed to a non-transitory recording medium storing a computer readable program to be executed by a hardware processor in a display device that includes a display part that displays a first display area and a second display area across a boundary and displays operation screens in the respective first and second display areas; and a manipulation part that detects a user operation performed to a display screen of the display part.

To achieve at least one of the abovementioned objects, according to an aspect of the present invention, the non-transitory recording medium reflecting one aspect of the present invention stores the computer readable program, execution of the computer readable program by the hardware processor in the display device causing the hardware processor to perform: determines whether or not a first operation and a second operation have continuity when the second operation is detected in the second display area after the first operation is detected in the first display area by the manipulation part; and updates the operation screen in the first display area in response to the second operation when the first operation and the second operation are determined to have continuity, and updates the operation screen in the second display area in response to the second operation when the first operation and the second operation are determined not to have continuity.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIGS. 7A and 7B explain a second condition;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
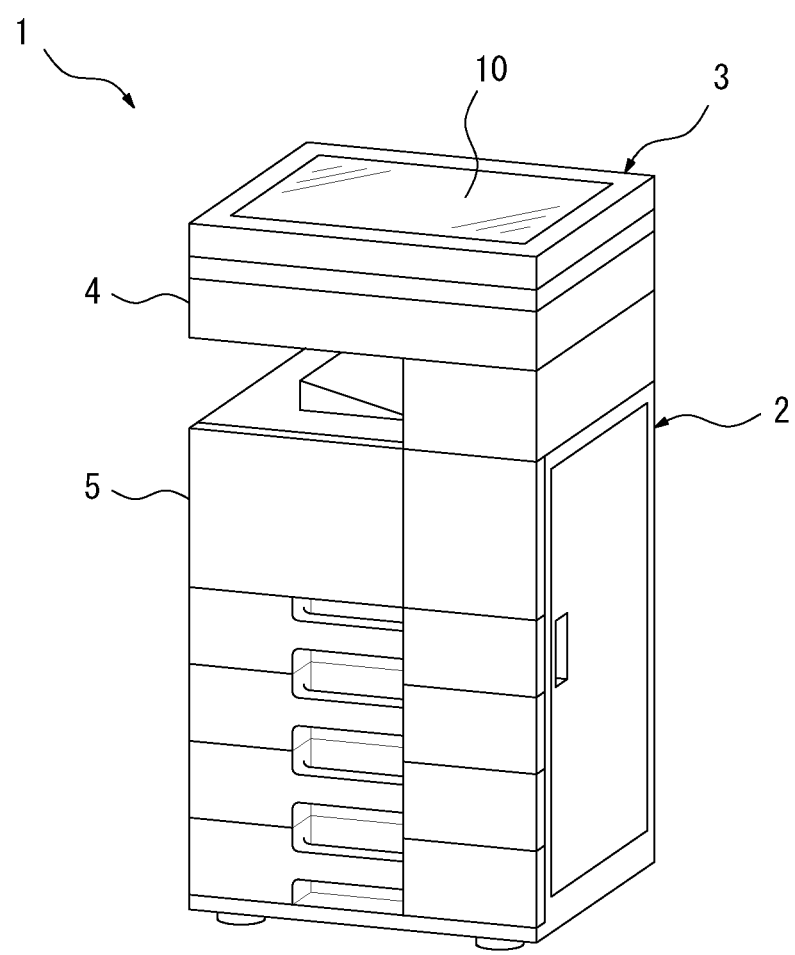
FIG. 1 illustrates an exemplary appearance structure of an image processing device to which a display device may be applied.

FIG. 1 illustrates an exemplary appearance structure of an image processing device 1 to which a display device 3 of the present invention may be applied. The image processing device 1 may be one of MFPs (Multifunction Peripherals) including multiple functions. The image processing device 1 includes a server function besides image processing functions such as a copy function, a scan function, a print function and/or a fax function, for instance. When a user selects the copy function, for instance, the image processing device 1 activates the image processing function to perform a job (a copy job). When the user selects the server function, the image processing device 1 activates the server function to provide the user with a service with the server function.

The image processing device 1 includes a device body 2 with the image processing function and the server function and the display device 3 which serves as a user interface for the user to use the image processing device 1. A printer section 5 is provided in a lower part of the device body 2. The printer section 5 becomes operative when the print job, the copy job or the fax receipt job is performed by the image processing device 1 to print an image on a sheet type printing paper and output. The device body 2 includes a scanner section 4 in an upper part of the printer section 5. The scanner section 4 becomes operative when the scan job, the copy job or the fax receipt job is performed by the image processing device 1 to read a document placed by the user and output image data.

The display device 3 is a touch panel type display device. The display device 3 is provided in a further upper part of the scanner section 4. The display device 3 includes a display unit 10 having a large screen size capable of displaying various types of images. The display device 3 is attached to an upper end of the device body 2 so as to make a display surface of the display unit 10 approximately flat. The display device 3 is enabled to display the operation screen to which the user operates the image processing function of the image processing device 1 on the display unit 10. The display device 3 is also enabled to display the operation screen to which the user operates the server function of the image processing device 1 on the display unit 10. Moreover, the display device 3 divides a display area of the display unit 10 into two display areas across a boundary. The display device 3 is enabled to display the operation screen for the user to operate the image processing function and the operation screen for the user to operate the server function at the same time in each display area. This type of the display device 3 may be detachable to the device body 2.

Figure 2:
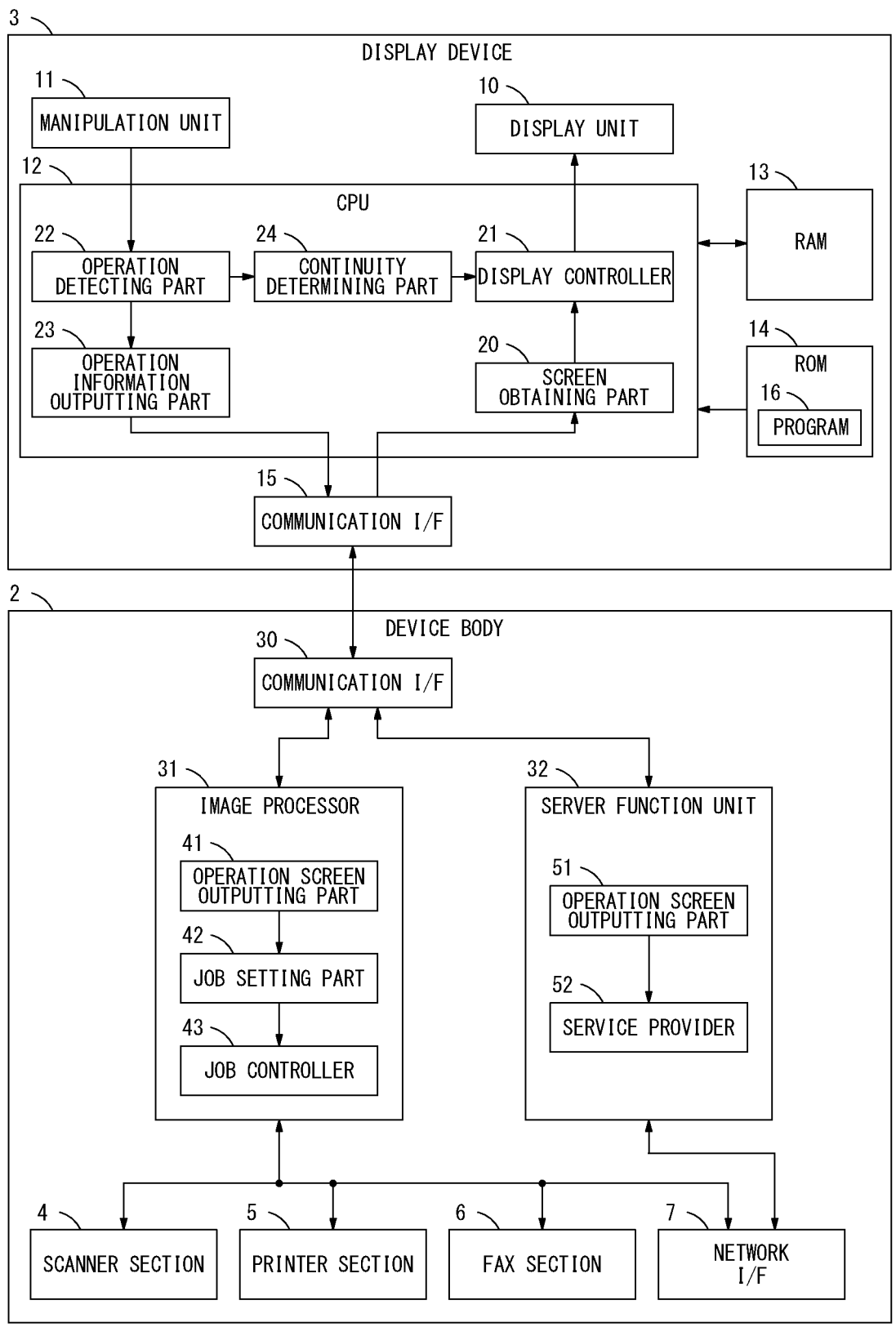
FIG. 2 illustrates a block diagram showing an example of a hardware structure and a functional structure of the image processing device.

FIG. 2 illustrates a block diagram showing an example of a hardware structure and a functional structure of the image processing device 1. The image processing device 1 connects the device body 2 and the display device 3 so that communications therebetween are enabled.

As the hardware structure, the display device 3 includes the display unit 10, a manipulation unit 11, a CPU 12, a RAM 13, a ROM 14 and a communication interface 15.

The display unit 10 is a flat panel display constructed by a device such as a color liquid crystal display, for instance.

A variety of screens may be displayed on the display unit 10. The manipulation unit 11 may be constructed by touch panel keys, for instance, arranged on the display screen of the display unit 10 to receive user inputs. It is assumed, for example, a touch operation is performed by the user to the display screen of the display unit 10. In this case, the manipulation unit 11 detects a position where the touch operation is performed, and outputs coordinate information of the operated position to the CPU 12 in real time. If the user moves the operated position (touched position) on the display screen, the manipulation unit 11 sequentially changes the coordinate information to output to the CPU 12 in real time in response to the movement of the operated position. The manipulation unit 11 is also capable of receiving multi touch operation performed to the display screen of the display unit 10.

The CPU 12 is a hardware processor that controls operations of each part of the display device 3. Especially the CPU 12 controls the operation screen displayed on the display unit 10 based on the user operation received by the manipulation unit 11. To be more specific, the CPU 12 reads and executes a program 16 stored in advance in the ROM 14 so that it may communicate with the device body 2 and obtain the operation screen for the user to operate the image processing function and the operation screen for the user to operate the server function. The CPU 12 displays at least one of the two operation screens on the display unit 10, and updates the operation screen displayed on the display unit 10 based on the user operation received by the manipulation unit 11. The CPU 12 may divide the display area of the display unit 10 across the boundary, and display the operation screen for the user to operate the image processing function and the operation screen for the user to operate the server function in respective first display area and second display area arranged across the boundary at the same time. The CPU 12 outputs operation information based on the user operation to the device body 2 as required. The detailed functions of the CPU 12 are explained later.

Temporal data generated in response to execution of the program 16 by the CPU 12 is stored in the RAM 13. The ROM 14 is formed from a non-volatility memory in which the program 16 executed by the CPU 12 is stored. The communication interface 15 is to perform wired or wireless communication with the device body 2. The communication interface 15 may perform one-to-one communication with the device body 2.

The device body 2 includes a communication interface 30, an image processor 31, a server function unit 32, the scanner section 4, the printer section 5, a fax section 6 and a network interface 7. The scanner section 4 and the printer section 5 have already been described earlier. The fax section 6 transmits and receives fax data over public phone lines, which are not shown in FIG. 2. The network interface 7 connects the image processing device 1 to a network such as a LAN (Local Area Network). The network interface 7 enables the image processing device 1 to communicate with another device such as a personal computer (PC).

The communication interface 30 is to perform wired or wireless communication with the display device 3. The communication interface 30 may perform one-to-one communication with the display device 3.

The image processor 31 performs a process corresponding to the image processing function of the image processing device 1. More specifically, the image processing device 31 controls execution of the job relating to each function such as the copy function, the scan function, the print function or the fax function, for example. The image processor 31 includes an operation screen outputting part 41, a job setting part 42 and a job controller 43. The operation screen outputting part 41 outputs the operation screen for the user to operate the image processing function to the display device 3 via the communication interface 30. The operation screen outputting part 41, for example, outputs the operation screen to configure job setting (a job setting screen) to the display device 3. When the operation information relating to the operation to the job setting screen is obtained from the display device 3, the job setting part 42 configures the job setting based on the operation information. The job controller 43 becomes operative when a job execution instruction is obtained from the display device 3. The job controller 43 drives the scanner section 4 or the printer section 5 in accordance with the job setting configured by the job setting part 42 to control the execution of the job.

The server function unit 32 performs a process corresponding to the server function of the image processing device 1. The server function unit 32 includes an operation screen outputting part 51 and a service provider 52. The operation screen outputting part 51 outputs the operation screen for the user to operate the server function to the display device 3 via the communication interface 30. The operation screen outputting part 51, for example, outputs the operation screen to configure the setting for using the server function (a service providing screen) to the display device 3. The service provider 52 provides a service with the server function. The service provided with the server function includes a variety of services that may be a service as a document server, a service as a mail server, a service as an application server, and a service as a storage server, for instance. The service provider 52 may provide at least one of the aforementioned services. The service provider 52 provides the service based on the operation information when the operation information relating to the operation to the service providing screen is obtained from the display device 3.

The aforementioned server function unit 32 is also capable of working together with the image processor 31. The image processor 31, for example, executes the scan job, and the image data may be read from the document. The server function unit 32 then obtains the image data. The server function unit 32 sends the image data to an external device via the network interface 7. The server function unit 32 works together with the image processor 31 so that a variety of job settings may be configured at the image processing device 1, resulting in improved user friendliness of the image processing device 1.

The functions of the CPU 12 of the display device 3 are explained next. The CPU 12 executes a program so that it serves as a screen obtaining part 20, a display controller 21, an operation detecting part 22, an operation information outputting part 23 and a continuity determining part 24.

The screen obtaining part 20 obtains the operation screen output from the device body 2, and stores the obtained operation screen in the RAM 13. The operation screens output from the device body 2 include two operation screens, the operation screen to operate the image processing function and the operation screen to operate the server function in a second display area R2. Once obtaining the two operation screens, the screen obtaining part 20 stores them in the RAM 13 and manages each of the operation screens stored in the RAM 13. At least one of the two operation screens may be updated in the device body 2. In such a case, the screen obtaining part 20 obtains the new operation screen which is being updated from the device body 2, and updates the operation screen stored in the RAM 13.

The display controller 21 controls the operation screen displayed on the display unit 10. When the operation screen is stored in the RAM 13 by the screen obtaining part 20, the display controller 21 reads the operation screen in the RAM 13, and outputs the read operation screen to the display unit 10 to display the operation screen. If the instruction to divide the screen is given by the user, the display controller 21 divides the display area of the display unit 10 into two areas so that both of the operation screen for the user to operate the image processing function and the operation screen for the user to operate the server function may be displayed at the same time.

Figure 3:
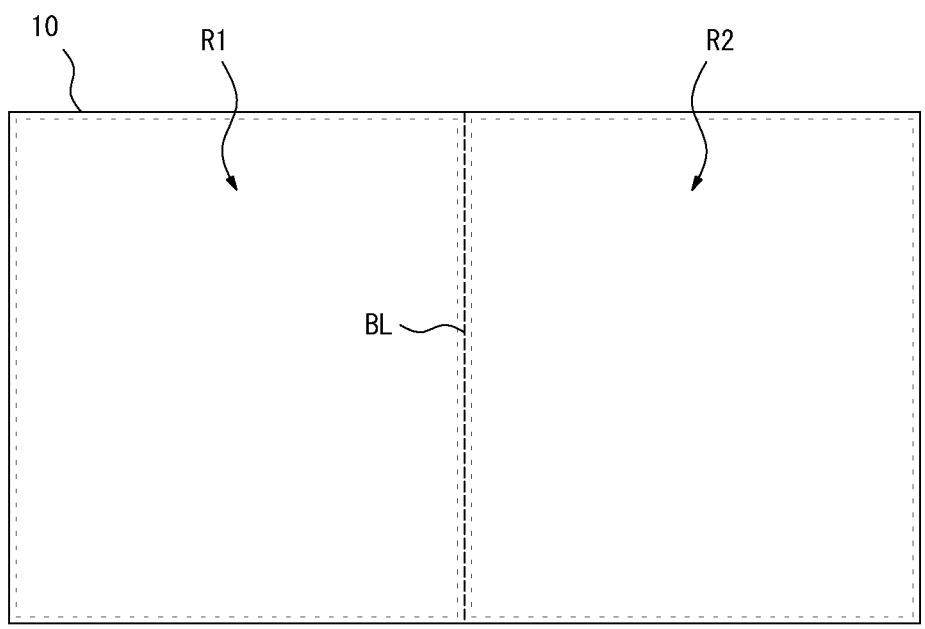
FIG. 3 illustrates an example of division of a display area of a display unit.

FIG. 3 illustrates an example of division of the display area of the display unit 10. In the example of FIG. 3, the display area of the display unit 10 is divided into two right and left areas across a boundary BL set in almost the center. In this example, the area on the left side is a first display area R1 and the area on the right side is the second display area R2, for instance. The display controller 21 displays the operation screen to operate the image processing function in the first display area R1 and the operation screen to operate the server function in the second display area R2, for example, so that two operation screens to use each of the image processing device and the server function may be displayed at the same time on the display unit 10. The operation screen to operate the server function may be displayed in the first display area R1 and the operation screen to operate the image processing function may be displayed in the second display area R2.

The operation detecting part 22 detects the user operation based on the coordinate information received from the manipulation unit 11. When, for example, the user performs the touch operation to the display screen of the display unit 10, the operation detecting part 22 detects start of the operation. If the touch operation performed by the user is continued, the operation detecting part 22 detects that the operation is continuing. When the touch operation performed by the user is terminated, the operation detecting part 22 detects termination of the operation. The operation detecting part 22 outputs the coordinate information sequentially obtained from the manipulation unit 11 to the display controller 21 and the operation information outputting part 23 from detection of the start of the operation to the detection of the termination of the operation. The display controller 21 is then enabled to appropriately update by scrolling the operation screen displayed on the display unit 10 based on the user operation, for example.

The display area of the display unit 10 may be divided into the first display area R1 and the second display area R2 by the display controller 21. In this case, the operation detecting part 22 outputs the coordinate information obtained from the manipulation unit 11 to the continuity determining part 24 from the detection of the start of the operation to the detection of the termination of the operation.

The operation detecting part 22 is capable of detecting multi-touch performed by the user. More specifically, when the manipulation unit 11 detects the touch operation touching multiple positions on the displays screen, it outputs information relating to the multiple coordinates to the operation detecting part 22. When the operation detecting part 22 receives the information relating to the multiple coordinates from the manipulation unit 11, it may detect that the multi-touch is performed by the user. The operation detecting part 22 then outputs information relating to each of the multiple coordinates obtained from the manipulation unit 11 to each of the display controller 21, the operation information outputting part 23 and the continuity determining part 24.

The operation information outputting part 23 identifies the operation performed by the user based on the coordinate information received from the operation detecting part 22, and determines if the operation should be notified to the device body 2. The operation may be the one that should be notified to the device body 2. The operation information outputting part 23 then generates the operation information corresponding to the user operation, and outputs the generated operation information to the device body 2. It is assumed, for example, that the user operation is one of the operations to change the variety of setting values, to give the job execution instruction and to give the instruction to start providing the service. In this case, the operation information outputting part 23 determines the operation should be notified to the device body 2, and sends the operation information corresponding to the user operation to the device body 2. The user operation may be the one that simply makes a change in the display of the operation screen such as scrolling of the operation screen. In such a case, the operation information outputting part 23 is not required to output the operation information to the device body 2.

The continuity determining part 24 becomes operative when the display area of the display unit 10 may be divided into the first display area R1 and the second display area R2 by the display controller 21. The continuity determining part 24 identifies the operation performed by the user based on the coordinate information received from the operation detecting part 22, and determines if the identified operation and the previously detected operation have the operation continuity. A first operation may be detected in one of the first display area R1 and the second display area R2 by the operation detecting part 22, then a second operation may be detected in another display area. The continuity determining part 24 then determines if the first operation and the second operation have the operation continuity. To be more specific, the continuity determining part 24 determines if the second operation is performed to follow the first operation. The second operation mentioned here is the operation detected after the first operation, and this may be the operation detected after the termination of the first operation or may be the operation detected before the termination of the first operation.

The continuity determining part 24 stores an operation start position of the first operation when the first operation is detected by the operation detecting part 22. When the first operation is detected by the operation detecting part 22, the continuity determining part 24 determines that the operation start position of the first operation is included in which display area, the first display area R1 or the second display area R2. The continuity determining part 24 then designates the operation screen displayed in the display area which includes the operation start position of the first operation as an update target screen. The continuity determining part 24 notifies the display controller 21 of the update target screen. As a result, the display controller 21 is enabled to figure out the operation screen to be updated in response to the first operation is either the operation screen displayed in the first display area R1 or the second display area R2.

Figure 4:
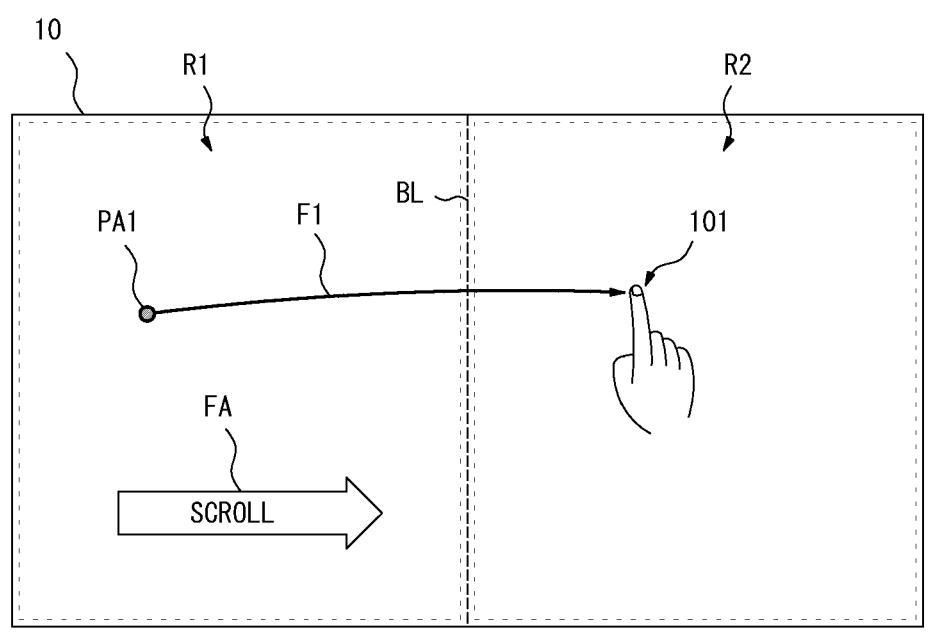
FIG. 4 illustrates an example of a first operation.

FIG. 4 illustrates an example of a first operation 101. It is assumed, for example, that the user starts the first operation 101 in the first display area R1 as illustrated in FIG. 4. In this case, an operation start position PA1 of the first operation 101 is included in the first display area R1. The continuity determining part 24 designates the operation screen displayed in the first display area R1 as the update target screen. The user may move an operated position in an arrow F1 direction as the first operation 101 while keeping the touching status to the screen. The display controller 21 then scrolls the operation screen displayed in the first display area R1 in an arrow FA direction, and updates the display of the operation screen.

When the operated position of the first operation 101 is moved from the first display area R1 to the second display area R2 across the boundary BL, the continuity determining part 24 determines the first operation 101 in the second display area R2 as the operation that follows the operation in the first display area R1, and notifies the display controller 21 of the update target screen. To be more specific, the continuity determining part 24 designates the update target screen based on the operation start position of the first operation 101. Even when the operated position of the first operation 101 is moved to another display area after designating the update target screen, the continuity determining part 24 does not change the update target screen identified at the start of the operation. The user may perform the operation to scroll the operation screen in the first display area R1 (for instance, flick operation) without being conscious of the boundary BL. Even when the operated position crosses over the boundary BL while the user is performing the first operation 101, the operation screen in the first display area R1 is kept being scroll displayed. The update of the operation screen in the second display area R2 in response to the first operation 101, which is unintended by the user, may be prevented.

Once the termination of the first operation 101 is detected by the operation detecting part 22, the continuity determining part 24 stores an operation termination position of the first operation 101. When a second operation 102 is detected by the operation detecting part 22, the continuity determining part 24 determines if the second operation and the first operation have the operation continuity.

Figure 5:
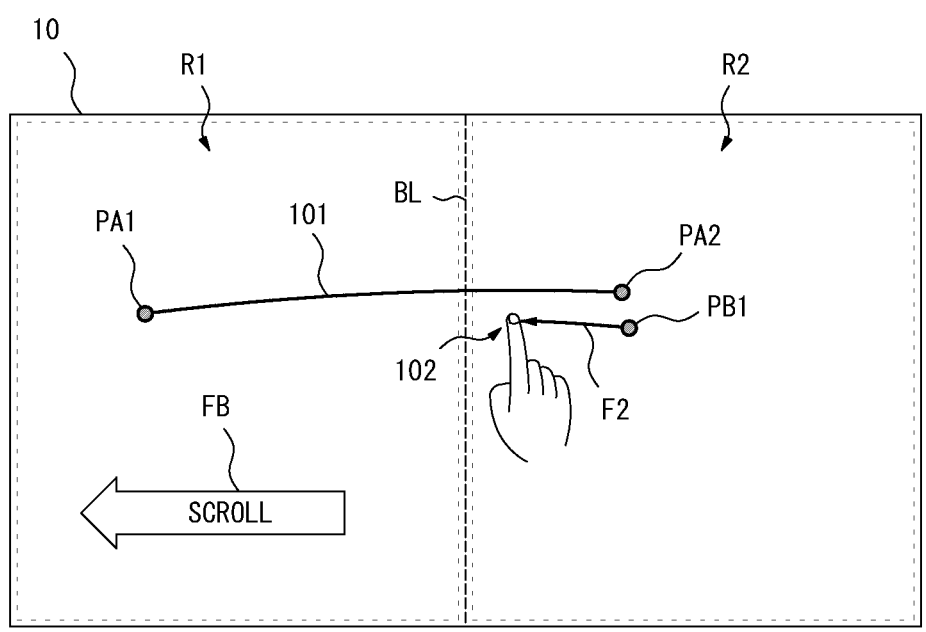
FIG. 5 illustrates an example of a second operation.

FIG. 5 illustrates an example of the second operation 102. In the example of FIG. 5, the operation termination position of the first operation 101 is included in the second display area R2. The user may start the second operation 102 in the second display area R2 after performing the first operation 101 as illustrated in FIG. 5. In such a case, the continuity determining part 24 stores an operation start position PB1 of the second operation 102. The continuity determining part 24 determines if the second operation 102 and the first operation 101 have the operation continuity.

When the continuity determining part 24 determines that the second operation 102 and the first operation 101 have the operation continuity, it designates the operation screen the same as the operation target screen of the first operation 101 as the operation target screen of the second operation 102, and notifies the display controller 21. As a result, the display controller 21 is enabled to update the operation screen in the first display area R1 in response to the second operation 102 as well as the first operation 101. The second operation 102 may be an operation to move in an arrow F2 direction as illustrated in FIG. 5, for instance. In such a case, the display controller 21 is enabled to scroll display the operation screen in the first display area R1 in the arrow FB direction.

Figure 6:
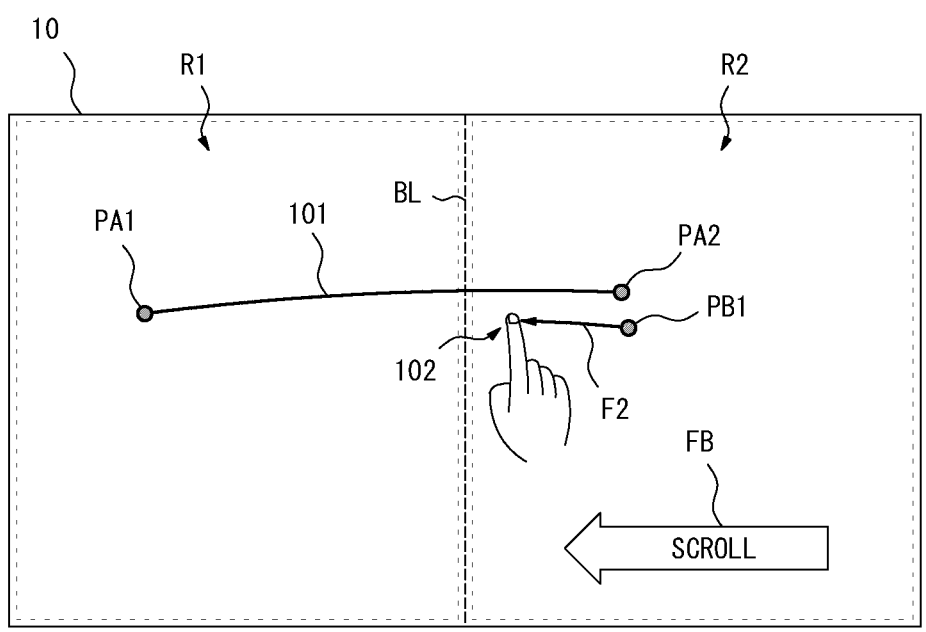
FIG. 6 illustrates an example of a screen update when the second operation does not follow the first operation.

By contrast, when the continuity determining part 24 determines that the second operation 102 and the first operation 101 do not have the operation continuity, it designates the operation screen with the display area which includes the operation start position of the second operation 102 as the operation target screen, and notifies the display controller 21. FIG. 6 illustrates an example of the screen update when the second operation 102 does not follow the first operation 101. It is assumed, for example, as illustrated in FIG. 6, the second operation 102 is detected in the second display area R2, and it is determined that the second operation and the first operation do not have the operation continuity. In such a case, the continuity determining part 24 designates the operation screen displayed in the second display area R2 as the operation target screen of the second operation 102. The display controller 21 then updates the operation screen displayed in the second display area R2 in response to the second operation 102. When, for example, as illustrated in FIG. 6, the second operation 102 is to move in the arrow F2 direction, the display controller 21 scroll displays the operation screen in the second display area R2 in an arrow FB direction.

There are multiple conditions for the continuity determining part 24 to determine that the second operation 102 follows the first operation 101. Namely, the second operation 102 and the first operation 101 have the continuity. When at least one of the multiple conditions is met, the continuity determining part 24 determines that the second operation 102 and the first operation 101 have the continuity. The continuity determining part 24 may determine that the second operation 102 and the first operation 101 have the continuity when more than two of the multiple conditions are met. The conditions determined by the continuity determining part 24 are explained below.

The conditions for the continuity determination when the second operation 102 is detected after the detection of the termination of the first operation 101 are explained below. There are first to fourth conditions, for example, explained next for the continuity determination conditions.

The first condition is that the operation start position PB1 of the second operation 102 to be included in the display area which is different from the one including the operation start position PA1 of the first operation 101 when the second operation 102 is detected after the detection of the termination of the first operation 101. In the example of FIG. 5, the operation start position PA1 of the first operation 101 is included in the first display area R1, and the operation start position PB1 of the second operation 102 is included in the second display area R2. In the example of FIG. 5, the first condition is met. The continuity determining part 24, therefore, determines that the second operation 102 and the first operation 101 have the continuity. Even when the first condition is met, the continuity determining part 24 may further determine whether or not another condition is met to determine if the second operation 102 and the first operation 101 have the continuity.

The second condition is that the second operation 102 is to be detected in a predetermined period of time after the termination of the first operation 101. FIGS. 7A and 7B explain the second condition. As illustrated in FIG. 7A, the continuity determining part 24 stores in advance a predetermined period of time TD for determining that the second operation 102 and the first operation 101 have the continuity. The user of the display device 3 (the image processing device 1) may set in advance any value for the predetermined period of time TD. The start of the first operation 101 may be detected at a time T1 and the termination of the first operation 101 may be detected at a time T2 as illustrated in FIG. 7A. The continuity determining part 24 then starts counting the predetermined period of time TD. At a time T3 which is prior to the elapse of the predetermined period of time TD, the second operation 102 may be detected. The continuity determining part 24 then determines that the second operation 102 and the first operation 101 have the continuity. On the other hand, the second operation 102 may be detected after elapse of the predetermined period of time TD. In such a case, the continuity determining part 24 determines that the second operation 102 and the first operation 101 do not have the continuity.

When the first operation 101 is to scroll the operation screen displayed in the first display area R1 as illustrated in FIG. 4, the display controller 21 may be continuing the display update of the operation screen in order to carry out inertial scrolling of the operation screen even after the termination of the first operation 101 as illustrated in FIG. 7B. In such a case, the user may try to perform the next operation after the operation screen of which the inertial scrolling is carried out is stopped. If the display update by the display controller 21 is continued, the continuity determining part 24 may extend the predetermined period of time TD. FIG. 7B illustrates an example when the predetermined period of time TD is extended. If the display update is continuously performed by the display controller 21 even after the first operation 101 is terminated at the time T2, the continuity determining part 24 extends the predetermined period of time TD. The continuity determining part 24 may stop starting counting operation of the predetermined period of time TD until the termination of the display update by the display controller 21. In this case, the period between the time T2 of the termination of the first operation 101 and a time Te of the termination of the display update is extended. The user may perform the second operation 102 after confirming the inertial scrolling of the operation screen is terminated. If the predetermined period of time TD is extended, the determination on the continuity between the second operation 102 and the first operation 101 may be appropriately carried out even in the aforementioned case. Even when the second condition is met, the continuity determining part 24 may further determine whether or not another condition is met to determine if the second operation 102 and the first operation 101 have the continuity.

Figure 8:
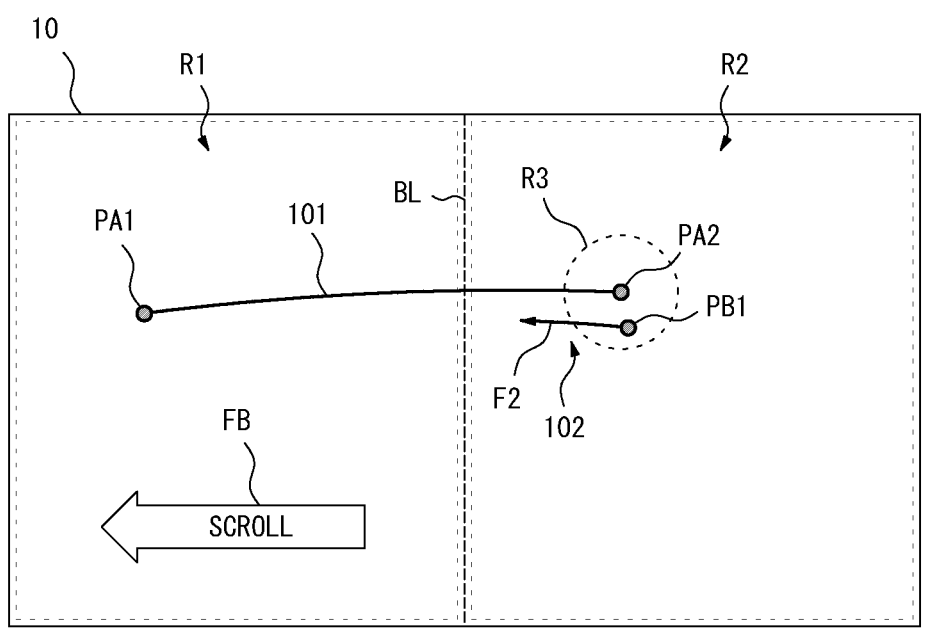
FIG. 8 explains a third condition.

The third condition is that the operation start position of the second operation 102 is to be detected within a range of a predetermined distance from the operation termination position of the first operation 101. FIG. 8 explains the third condition. As illustrated in FIG. 8, the continuity determining part 24 determines that the second operation 102 and the first operation 101 have the continuity when the second operation 102 is detected in an area R3 which is within the range of the predetermined distance from the operation termination position PA2 of the first operation 101 after the termination of the first operation 101 is detected. To be more specific, if the operation start position PB1 of the second operation 102 is included in the area R3 as illustrated in FIG. 8, the operation target screen of the second operation 102 would be the operation screen in the first display area R1 as well as the first operation 101. Once the second operation 102 is moved in the arrow F2 direction, the operation screen in the first display area R1 is scroll displayed in the arrow FB direction.

Figure 9:
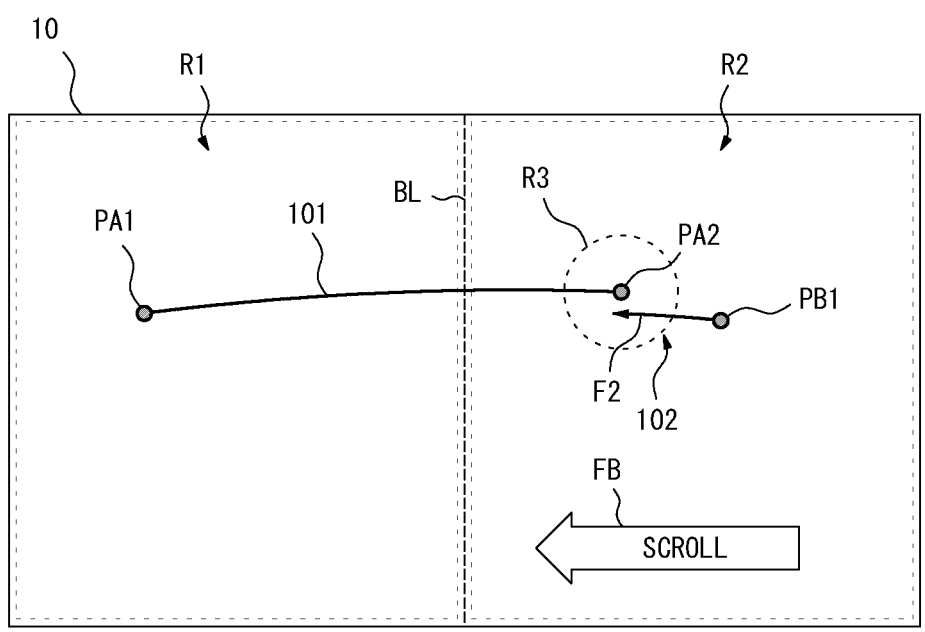
FIG. 9 illustrates an example when an operation start position of the second operation is outside a predetermined area.

FIG. 9 illustrates an example when the operation start position PB1 of the second operation 102 is outside the area R3. As illustrated in FIG. 9, when the operation start position PB1 of the second operation 102 is outside the area R3, the continuity determining part 24 denies the continuity between the second operation 102 and the first operation 101. As a result, the operation target screen of the second operation 102 would be the operation screen in the second display area R2. Once the second operation 102 is moved in the arrow F2 direction, the operation screen in the second display area R2 is scroll displayed in the arrow FB direction.

Even when the third condition is met, the continuity determining part 24 may further determine whether or not another condition is met to determine if the second operation 102 and the first operation 101 have the continuity. Even when the third condition is not met, the continuity determining part 24 may determine the second operation 102 and the first operation 101 have the continuity if another condition is met.

The fourth condition is that the moving direction of the first operation 101 and the moving direction of the second operation 102 to have a relevance between each other. It is assumed, for example, the first operation 101 is to scroll the operation screen. In this case, the second operation 102 that follows the first operation 101 should be the operation to scroll the operation screen in the same direction or the opposite direction from the first operation 101. When the second operation 102 is detected after the detection of the termination of the first operation 101, the continuity determining part 24 compares a linearity of the first operation 101 and a linearity of the second operation 102 to carry out the continuity determination.

Figure 10A:
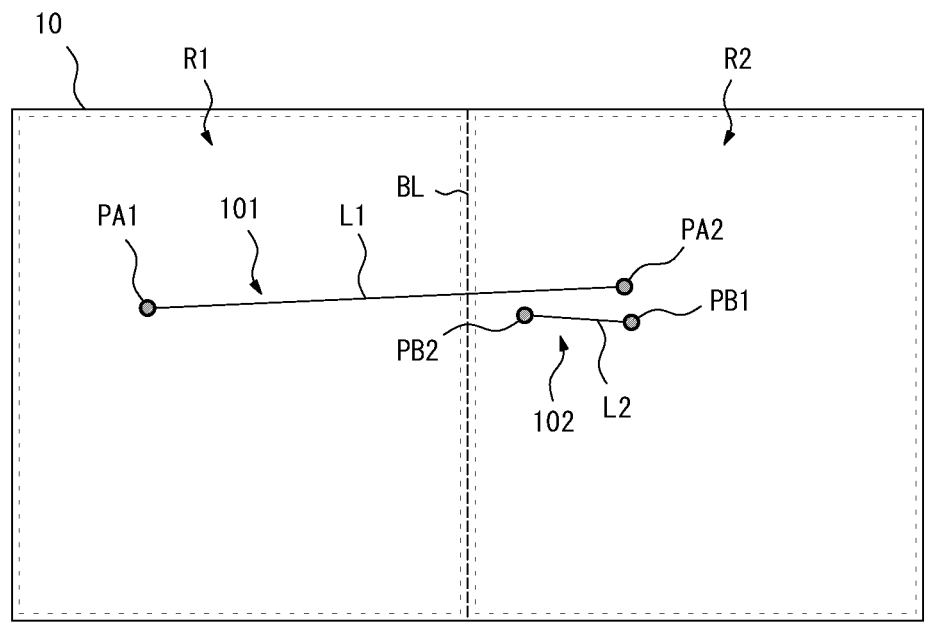
FIGS. 10A and 10B explain a fourth condition.
Figure 10B:
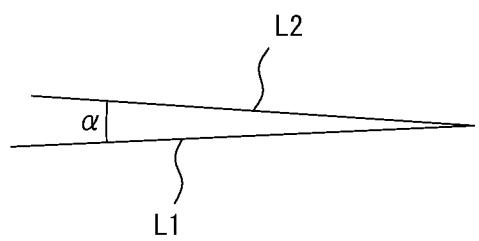

FIGS. 10A and 10B explain the fourth condition. The continuity determining part 24 determines the fourth condition when the second operation 102 is detected after the termination of the first operation 101, and the initial moving direction of the second operation 102 is detected. As illustrated in FIG. 10A, the continuity determining part 24 finds a first straight line L1 connecting the operation start position PA1 and an operation termination position PB2 of the first operation 101 and a second straight line L2 connecting the operation start position PB1 and the current position PB2 of the second operation 102. The continuity determining part 24 calculates an inside angle α formed when the first straight line L1 and the second straight line L2 cross as illustrated in FIG. 10B. There are two angles, the large angle and the small angle, formed when the first straight line L1 and the second straight line L2 cross. The angle α is the small angle. When the angle α formed by the first straight line L1 and the second straight line L2 is equal to or smaller than a predetermined angle θ (for instance, θ≤30 degrees), the continuity determining part 24 determines the second operation 102 and the first operation 101 have the continuity. If the angle α is greater than the predetermined angle θ, the continuity determining part 24 determines the second operation 102 and the first operation 101 do not have the continuity.

When it is determined that the second operation 102 and the first operation 101 have the continuity based on the fourth condition, the display controller 21 sets the operation target screen of the second operation 102 the same as that of the first operation 101, and scroll displays the operation screen in the first display area R1 in response to the second operation 102.

Figure 11:
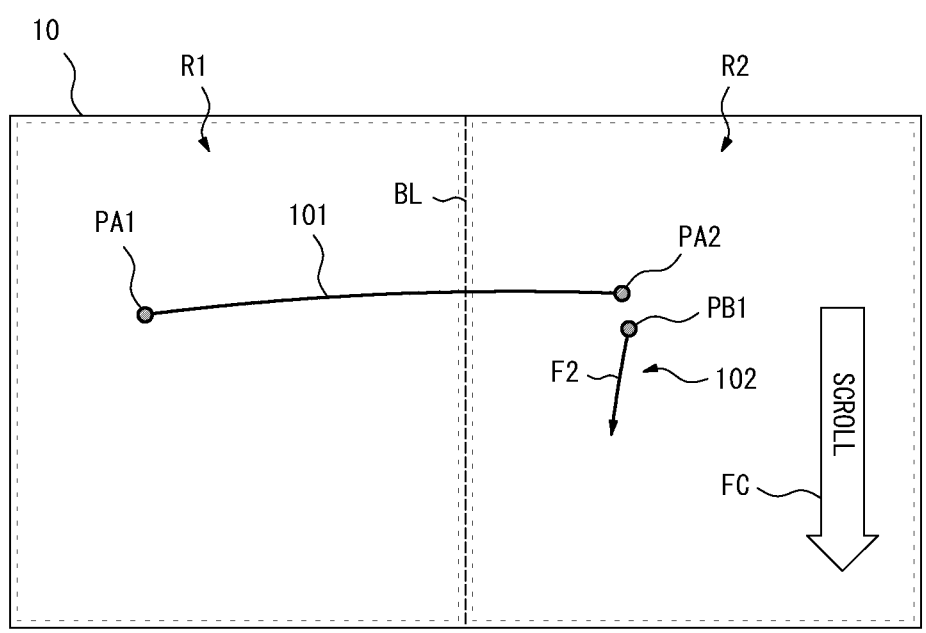
FIG. 11 illustrates an example of the screen update when it is determined that the second operation and the first operation do not have the continuity based on the fourth condition.

FIG. 11 illustrates an example of the screen update when it is determined that the second operation 102 and the first operation 101 do not have the continuity based on the fourth condition. As illustrated in FIG. 11, when the second operation 102 initially moves in the arrow F2 direction, the angle α exceeds the predetermined angle θ. Thus, the continuity determining part 24 denies the continuity between the second operation 102 and the first operation 101. The display controller 21 then scroll displays the operation screen in the second display area R2 which includes the operation start position PB1 of the second operation 102 in an arrow FC direction in response to the second operation 102.

Figure 12:
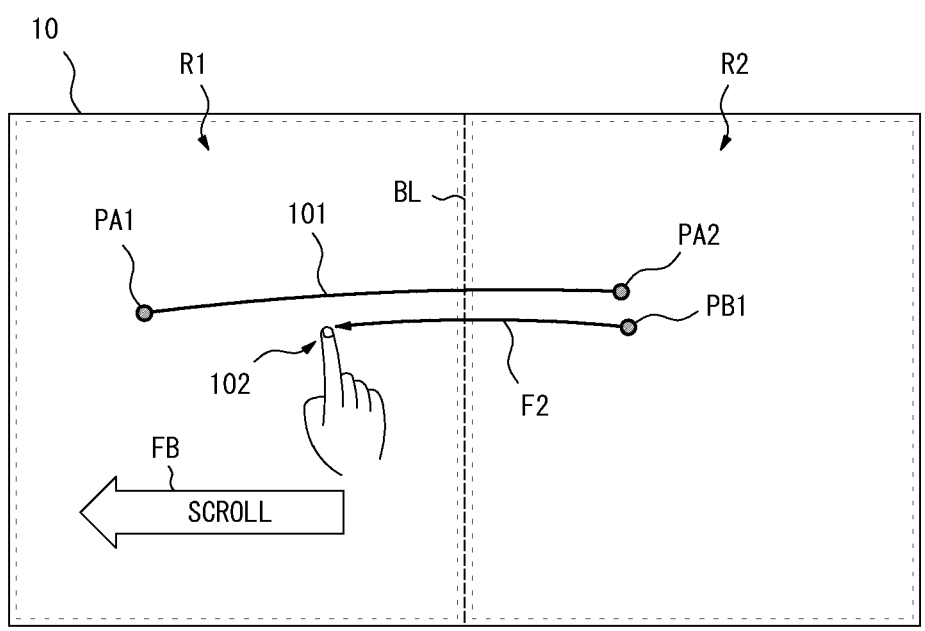
FIG. 12 illustrates an example of the screen update when the second operation crosses a boundary.

After the continuity between the second operation 102 and the first operation 101 is determined in affirmation, the operated position of the second operation 102 may be moved to another display area across the boundary BL. Even in such a case, the continuity determining part 24 does not change the operation target screen of the second operation 102. FIG. 12 illustrates an example of the screen update when the second operation 102 crosses the boundary BL. It is assumed, for example, as illustrated in FIG. 12, after the continuity of the second operation 102 is determined in affirmation, the current position of the second operation 102 is moved from the second display area R2 to the first display area R1 across the boundary BL. In this case, the operation screen in the first display area R1 is designated as the operation target screen of the second operation 102, which is the same as before. The display controller 21 scroll displays the operation screen in the first display area R1 in the arrow FB direction in response to the second operation 102 which is continued across the boundary BL. Such display control may be applied not only when the continuity of the second operation 102 is determined in affirmation but also the continuity of the second operation 102 is denied.

Figure 13:
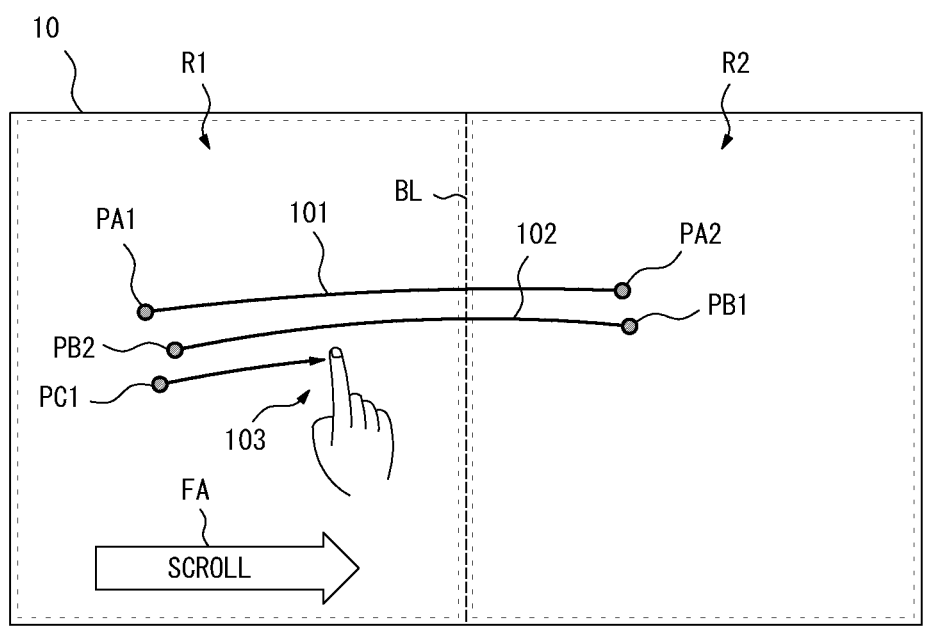
FIG. 13 illustrates an example when a third operation is detected after the termination of the second operation.

When the third operation is detected after the detection of the termination of the second operation, the continuity determining part 24 determines whether or not the third operation and the second operation have the continuity. FIG. 13 illustrates an example when a third operation 103 is detected after the termination of the second operation 102. It is assumed, for example, as illustrated in FIG. 13, the first operation 101 started in the first display area R1 terminates in the second display area R2, then the second operation 102 started in the second display area R2 terminates in the first display area R1. The third operation 103 may be detected by the operation detecting part 22 after the termination of the second operation 102. In this case, the continuity determining part 24 determines whether or not the third operation 103 and the second operation 102 have the continuity. The continuity determining part 24 determines continuity by determining at least one of the first to the fourth conditions as described above, for example. The continuity determining part 24 may determine the third operation 103 and the second operation 102 have the continuity as a result of the determination. The continuity determining part 24 then designates the same operation screen as the operation target screen of the second operation 102 as the operation target screen of the third operation 103, and notifies the display controller 21. The operation screen updated in response to the second operation 102 is continuously updated in response to the third operation 103. The second operation 102 may be, for instance, to scroll the operation screen in the first display area R1. In this case, the display controller 21 scroll displays the operation screen in the first display area R1 in the arrow FA direction as illustrated in FIG. 13 based on the movement of the third operation 103 started at an operation start position PC1.

Figure 14:
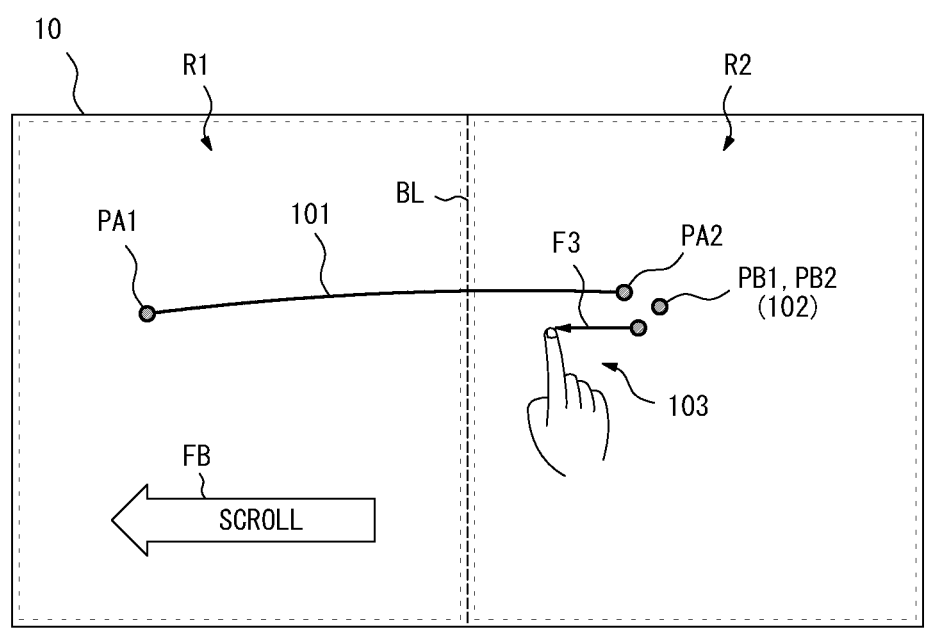
FIG. 14 illustrates another example when the third operation is detected after the termination of the second operation.

FIG. 14 illustrates another example when the third operation 103 is detected after the termination of the second operation 102. In the example of FIG. 14, the second operation 102 that follows the first operation 101 is a single tap. If the second operation 102 is the single tap, the operation start position PB1 and the operation termination position PB2 of the second operation 102 are detected at the same position. When the second operation 102 is detected as the single tap while the inertial scrolling of the operation screen in the first display area R1 is carried out in response to the first operation 101, for example, the scroll of the operation screen is stopped. The third operation 103 may be detected after the detection of the termination of the second operation 102. The continuity determining part 24 then determines whether or not the third operation 103 and the second operation 102 have the continuity. Also in this case, the continuity determining part 24 determines continuity by determining at least one of the first to the fourth conditions as described above, for example. The continuity determining part 24 may determine that the third operation 103 and the second operation 102 have the continuity as a result of the determination. The continuity determining part 24 designates the same operation screen as the operation target screen of the second operation 102 as the operation target screen of the third operation 103, and notifies the display controller 21. Thus, when the third operation 103 moves in an arrow F3 direction as illustrated in FIG. 14, the operation screen in the first display area R1 is enabled to be scrolled in the arrow FB direction.

As described above, when the third operation 103 is detected after the termination of the second operation 102 is detected, the continuity determining part 24 manages the second operation 102 as the same as the aforementioned first operation 101 and manages the third operation 103 as the same as the aforementioned second operation 102 so that the continuity determining part 24 carries out the continuity determination of the third operation 103. In other words, the continuity determining part 24 determines the continuity between the following operation and the previous operation every time the operation to the display unit 10 is detected by the operation detecting part 22.

Figure 15:
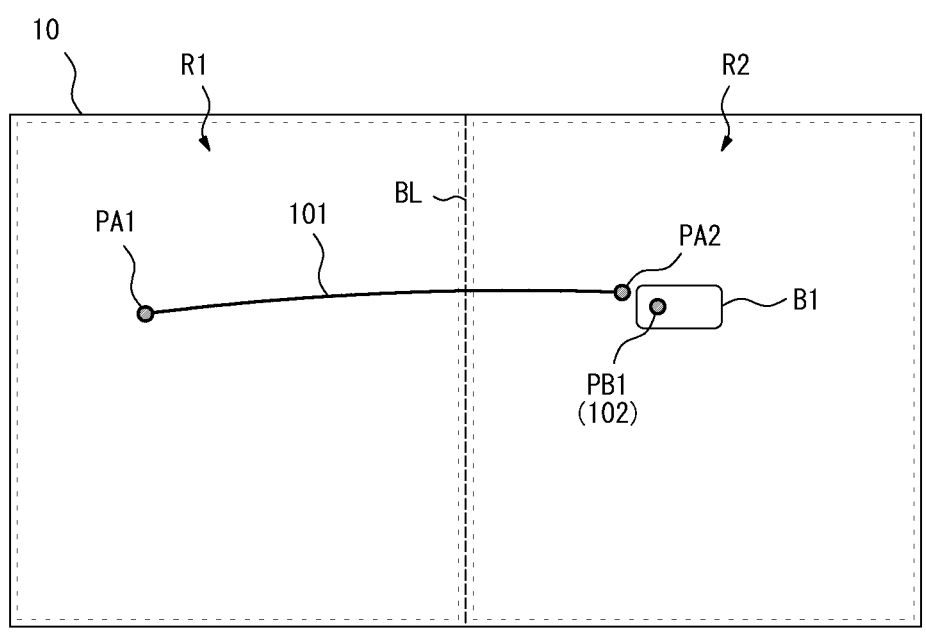
FIG. 15 illustrates an example when the second operation does not have the continuity.

The second operation 102 may be detected after the detection of the termination of the first operation 101, and the aforementioned first to fourth conditions may be met. Even in such a case, the continuity determining part 24 may determine that the second operation 102 is the separate operation which does not follow the first operation 101. FIG. 15 illustrates an example when the second operation 102 does not have the continuity. In the example of FIG. 15, for example, a content (for instance, an operation button) B1 operable for the user is displayed near the operation termination position PA2 of the first operation 101 in the operation screen being displayed in the second display area R2. The operation start position PB1 of the second operation 102 then may be overlapped with the display position of the content B1. In such a case, the continuity determining part 24 determines whether or not the second operation 102 performed by the user is a long press. In general, the long press is one of operations for the user to select the content B1 such as the operation button. When determining that the second operation 102 detected in the display position of the content B1 is the long press, the continuity determining part 24 determines that second operation 102 is the operation that does not follow the first operation 101 and is to select the content B1. To be more specific, even when the second operation 102 meets the aforementioned first to fourth conditions, the continuity determining part 24 denies the continuity of the second operation. As a result, the user's operation may be appropriately applied.

The continuity determining part 24 may determine possibility that the operation which follows the first operation 101 is to be performed by analyzing the first operation 101 at the time of the detection of the termination of the first operation 101 by the operation detecting part 22. When determining there is no possibility that the operation that follows the first operation 101 is to be performed, the continuity determining part 24 does not carry out the continuity determination of the second operation 102 at the time of the detection of the second operation 102 after the first operation 101, and identifies the second operation 102 as the independent operation which does not relate to the first operation 101.

Figure 16:
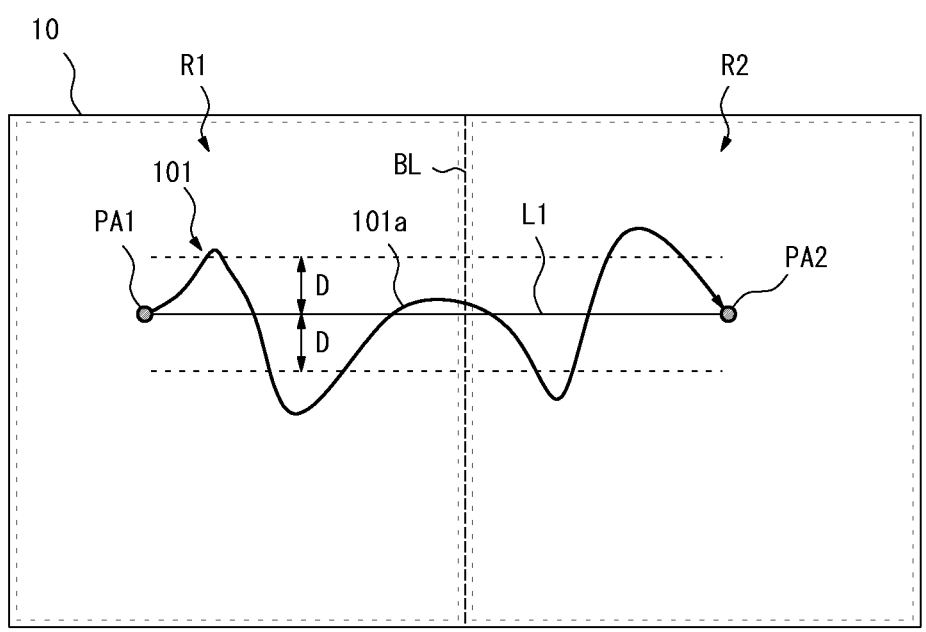
FIG. 16 illustrates an example of analysis of the first operation carried out by a continuity determining part.

FIG. 16 illustrates an example of analysis of the first operation 101 carried out by the continuity determining part 24. Once the termination of the first operation 101 at the operation termination position PA2 is detected, the continuity determining part 24 calculates a moving path 101a from the operation start position PA1 to the operation termination position PA2 of the first operation 101. The moving path 101a shows a path on which the user operated position has actually moved in response to the first operation 101. The continuity determining part 24 then calculates the straight line L1 which connects the operation start position PA1 and the operation termination position PA2 of the first operation 101. The continuity determining part 24 determines if the moving path 101a of the first operation 101 is in a range of a predetermined distance D1 from the straight line L1.

As illustrated in FIG. 16, the moving path 101a of the first operation 101 may not be in the range of the predetermined distance D1 from the straight line L1. The continuity determining part 24 determines there is no possibility that the operation that follows the first operation 101 would be performed next. In this case, when the second operation 102 is detected after the determination, the continuity determining part 24 identifies the second operation 102 as the operation that does not follow the first operation 101 without carrying out the continuity determination of the second operation 102. Thus, the operation screen in the display area in which the operation start position PB1 of the second operation 102 is detected is designated as the operation target screen of the second operation 102.

Figure 17:
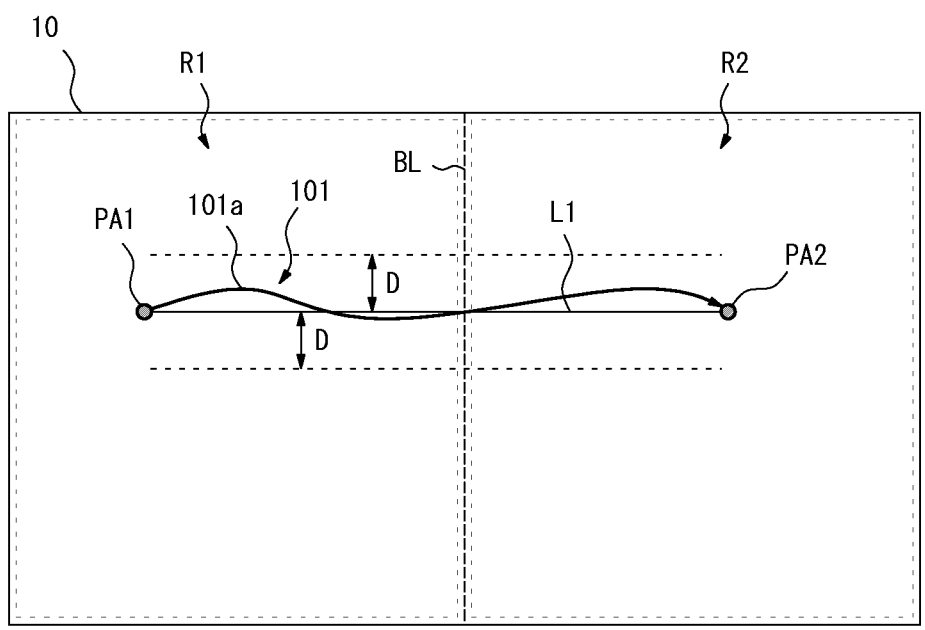
FIG. 17 illustrates an example when a moving path of the first operation is in a range of a predetermined distance.

FIG. 17 illustrates an example when the moving path 101a of the first operation 101 is in the range of the predetermined distance D1 from the straight line L1. When the moving path 101a of the first operation 101 is in the range of the predetermined distance D1 from the straight line L1 as illustrated in FIG. 17, the continuity determining part 24 determines that there is a possibility that the operation following the first operation 101 may be performed next. In this case, the continuity determining part 24 determines the continuity of the second operation 102 as described above once the second operation 102 is detected thereafter, and designates the operation target screen of the second operation 102 based on the determination result.

The operation detecting part 22 may detect the third operation 103 during the second operation 102 which is determined by the continuity determining part 24 as the operation that follows the first operation 101. The continuity determining part 24 cannot carry out the determination to see whether or not the third operation 103 and the second operation 102 have the continuity by applying the first to the fourth conditions as described above as the second operation 102 has not been terminated yet. If the third operation 103 is detected during the second operation 102, the continuity determining part 24 carries out the determination of the continuity between the third operation 103 and the first operation 101.

Figure 18:
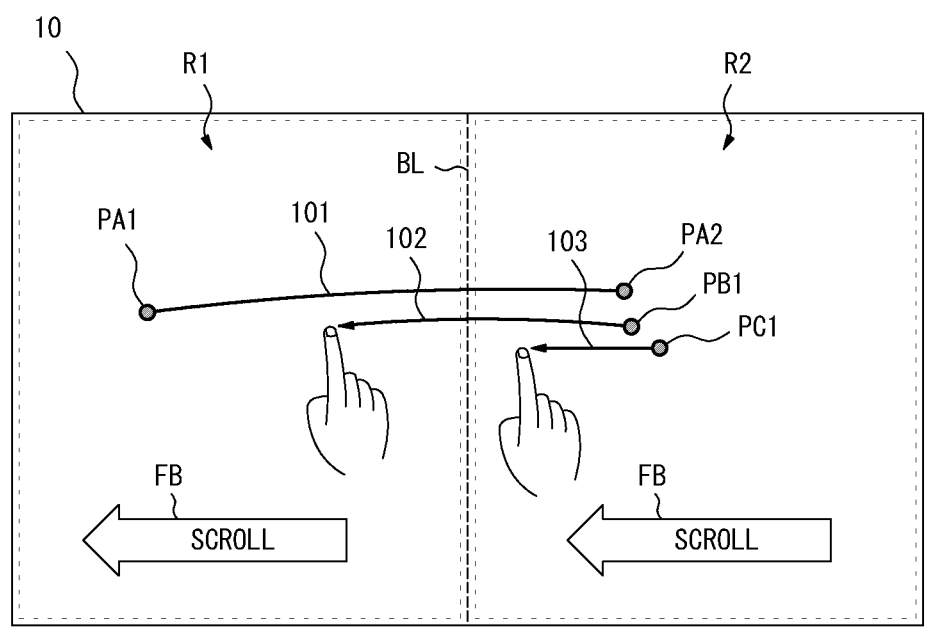
FIG. 18 illustrates an example of a continuity determination when the third operation is detected during the second operation.

FIG. 18 illustrates an example of the continuity determination when the third operation 103 is detected during the second operation 102. It is assumed, for example, as illustrated in FIG. 18, after the termination of the first operation 101, the second operation 102 is detected, and the second operation 102 is determined as the operation that follows the first operation 101. In this case, if the operation detecting part 22 detects the third operation 103 during the second operation 102, the continuity determining part 24 stores an operation start position PC1 of the third operation 103. The second operation 102 is still continued, so the continuity determining part 24 determines whether or not the third operation 103 and the first operation 101 have the continuity. The continuity determining part 24 determines whether or not the relation between the third operation 103 and the first operation 101 meets at least one of the first to the fourth conditions as described above. As a result, the third operation 103 may be determined as the operation that follows the first operation 101. The continuity determining part 24 then designates the operation screen the same as the operation target screen of the first operation 101 as the operation target screen of the third operation 103. When determining that the third operation 103 and the first operation 101 do not have the continuity, the continuity determining part 24 designates the operation screen in the second display area R2 including the operation start position PC1 of the third operation 103 as the operation target screen of the third operation 103. In the example of FIG. 18, the third operation 103 is determined as the operation that does not follow the first operation 101. Once the operation screen in the second display area R2 is moved in the direction as illustrated in FIG. 18, the operation screen in the second display area R2 is scrolled in the arrow FB direction in response to the third operation 103. Thus, the operation screen in the first display area R1 and the operation screen in the second display area R2 are updated at the same time.

an example when the second operation 102 is detected prior to the detection of the termination of the first operation 101 is explained next. When the second operation 102 is detected prior to the detection of the termination of the first operation 101, the second operation 102 that follows the first operation 101 includes pinch operation or rotation operation performed with two fingers. To be more specific, the pinch operation or the rotation operation is performed to the operation screen displayed in the single display area even when the two fingers are detected in the different areas. If, therefore, the first operation 101 is detected, and the second operation 102 is detected in the display area different from the first operation 101 prior to the detection of the termination of the first operation 101, the continuity determining part 24 determines if the operations performed in response to the first operation 101 and the second operation 102 are the pinch operation or the rotation operation. Once the first operation 101 and the second operation 102 are identified to be the pinch operation or the rotation operation, the continuity determining part 24 determines that the second operation 102 and the first operation 101 have the continuity.

Figure 19A:
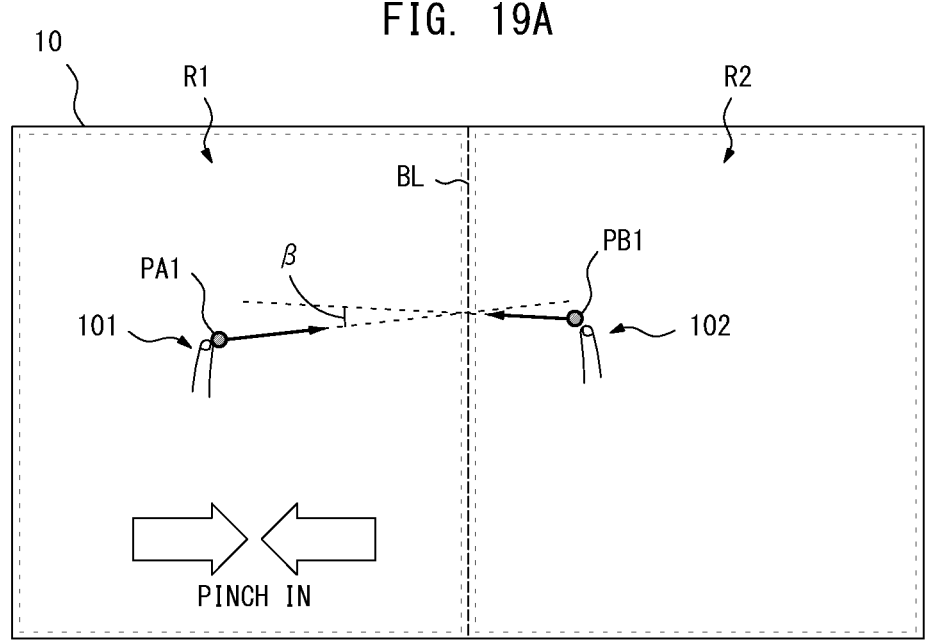
FIGS. 19A and 19B illustrate an example of determination of a pinch operation.
Figure 19B:
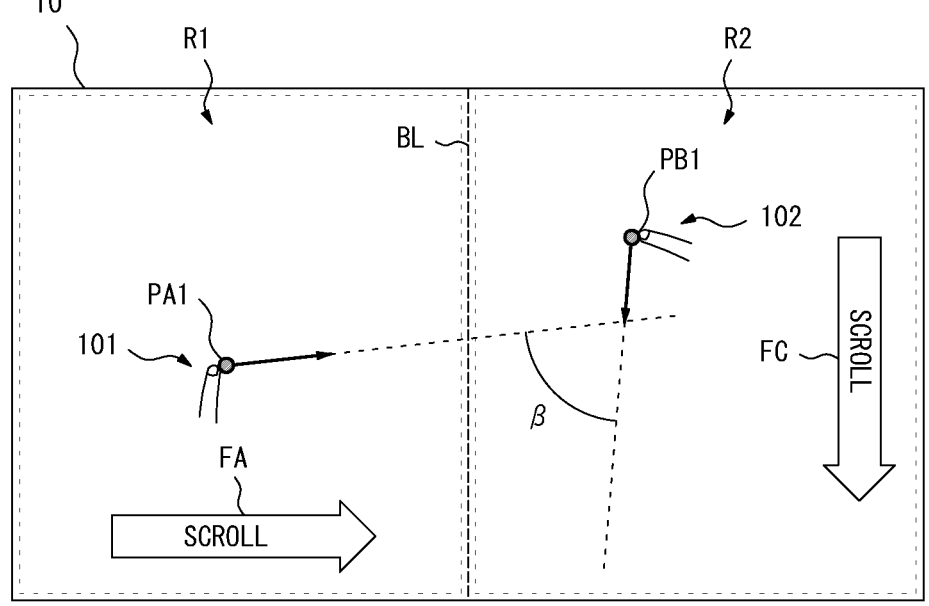

FIGS. 19A and 19B illustrate an example of determination of the pinch operation. As illustrated in FIG. 19A, for example, it is assumed that the second operation 102 is detected in the second display area R2 after the first operation 101 is detected in the first display area R1. The continuity determining part 24 detects the initial movements of the first operation 101 and the second operation 102. The initial movement of the first operation 101 may be moving in the straight line direction and the initial movement of the second operation 102 may also be moving in the straight line direction. The continuity determining part 24 then determines there is a possibility that the first operation 101 and the second operation 102 may be the pinch operation relating to each other. If there is the possibility of the pinch operation, the continuity determining part 24 calculates an angle β formed by the initial movement direction of the first operation 101 and the initial movement direction of the second operation 102. The continuity determining part 24 determines if the angle β is equal to or smaller than a predetermined angle θ (for instance, θ≤30 degrees). When the angle β is equal to or smaller than the predetermined angle θ (for instance, θ≤30 degrees), the continuity determining part 24 determines that the second operation 102 and the first operation 101 have the continuity, and determines that the second operation 102 and the first operation 101 are the pinch operations to pinch in or pinch out the operation screen displayed in the first display area R1. As a result, the operated position of the first operation 101 and the operated position of the second operation 102 may get close to each other as illustrated in FIG. 19A. The screen update to enable the operation screen in the first display area R1 to be pinched in is carried out.

If the angle β exceeds the predetermined angle θ as illustrated in FIG. 19B, the continuity determining part 24 determines that the second operation 102 and the first operation 101 do not have the continuity. The operation screen displayed in the second display area R2 is then designated as the operation target screen of the second operation 102 which is detected in the display area different from the first operation 101. The operation screen in the first display area R1 is scroll displayed in the arrow FA direction in response to the first operation 101 as illustrated in FIG. 19B, and the operation screen in the second display area R2 is scroll displayed in the arrow FC direction in response to the second operation 102.

Figure 20A:
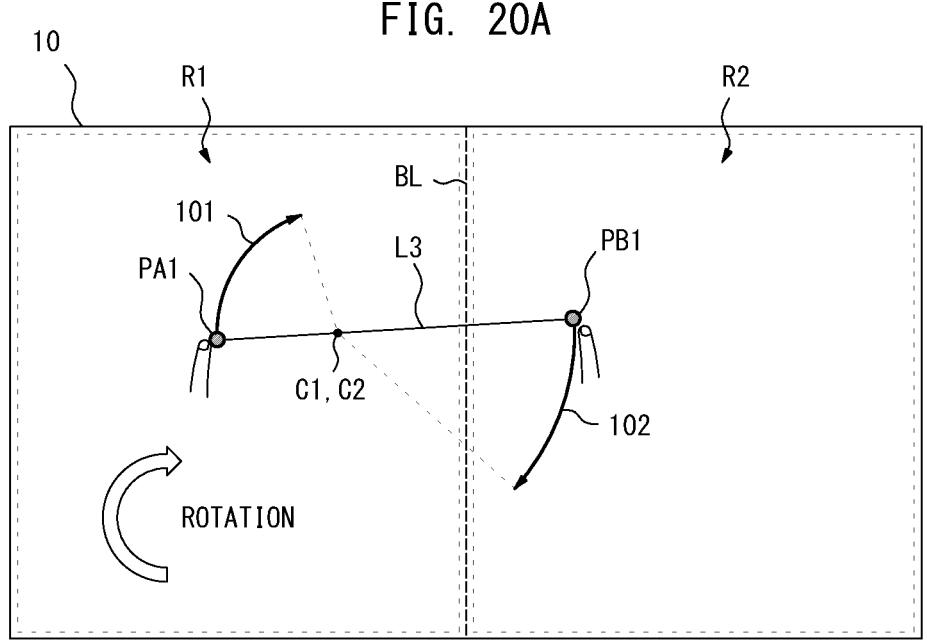
FIGS. 20A and 20B illustrate an example of determination of a rotation operation.
Figure 20B:
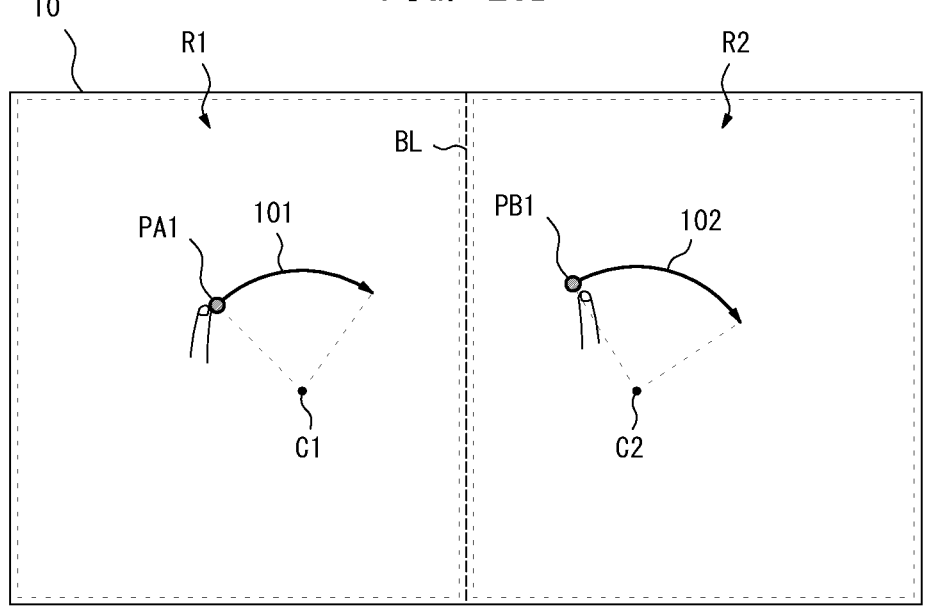
Figure 21:
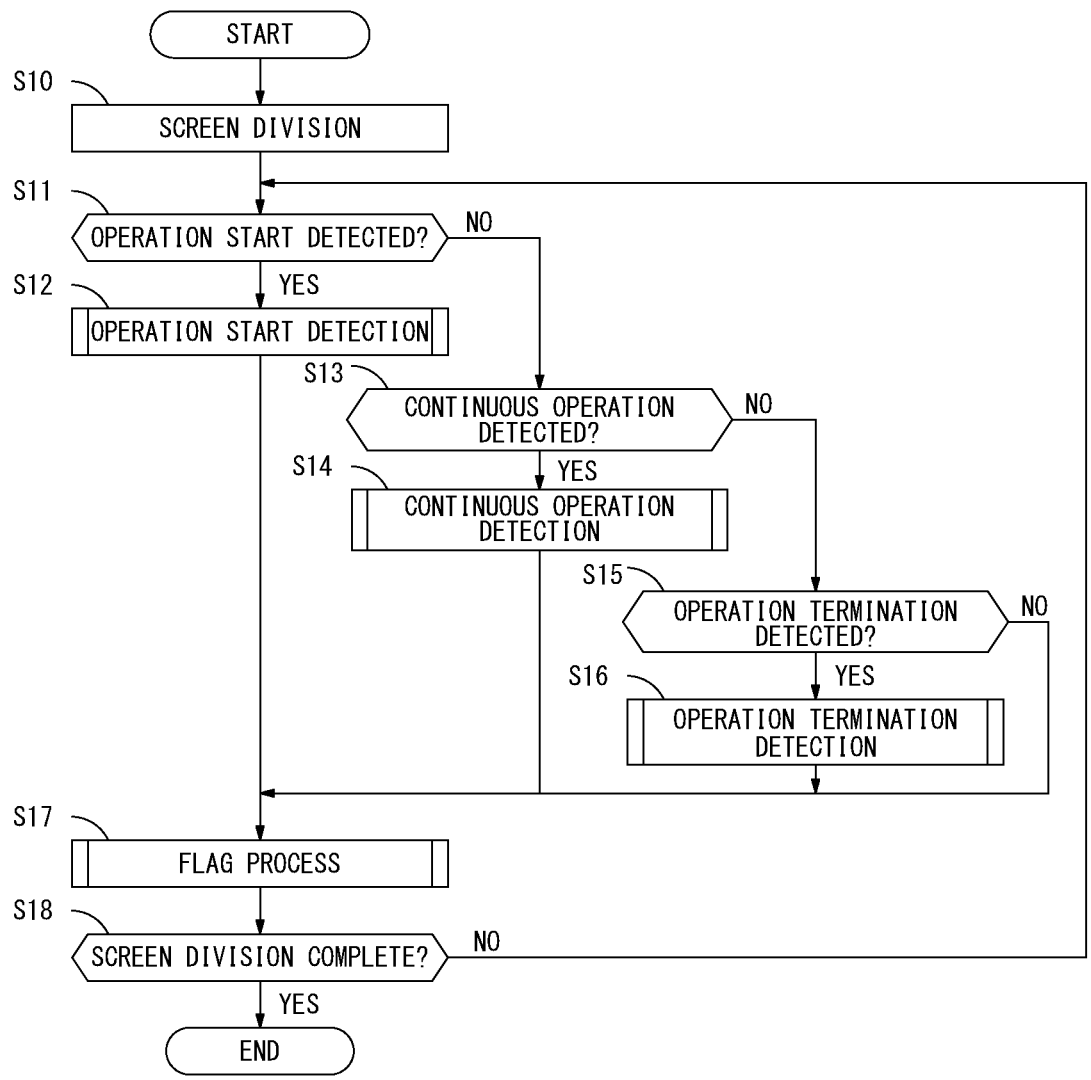
FIG. 21 illustrates a flow diagram explaining an exemplary procedure of a main process performed at the display device.

FIGS. 20A and 20B illustrate an example of determination of the rotation operation. As illustrated in FIG. 20A, for example, it is assumed that the second operation 102 is detected in the second display area R2 after the first operation 101 is detected in the first display area R1. The continuity determining part 24 detects the initial movements of the first operation 101 and the second operation 102. The initial movement of the first operation 101 may be moving in the rotation direction and the initial movement of the second operation 102 may also be moving in the rotation direction. The continuity determining part 24 then determines there is a possibility that the first operation 101 and the second operation 102 may be the rotation operation relating to each other. If there is the possibility of the rotation operation, the continuity determining part 24 calculates a center position C1 of the rotation direction of the first operation 101 and a center position C2 of the rotation direction of the second operation 102. The continuity determining part 24 calculates a straight line L3 connecting the operation start position PA1 of the first operation 101 and the operation start position PB1 of the second operation 102. When the two center positions C1 and C2 are near the straight line L3, the continuity determining part 24 determines that the second operation 102 and the first operation 101 have the continuity, and determines that the first operation 101 and the second operation 102 are the rotation operations to rotate the operation screen displayed in the first display area R1. As a result, the operated position of the first operation 101 and the operated position of the second operation 102 may be rotated on the center positions C1 and C2 as illustrated in FIG. 20A. The screen update to enable the operation screen in the first display area R1 to be rotated is then carried out.

The two center positions C1 and C2 may not be near the straight line L3 connecting the operation start positions PA1 and PA2 as illustrated in FIG. 20B. In such a case, the continuity determining part 24 determines that the second operation 102 and the first operation 101 do not have the continuity. The operation screen displayed in the second display area R2 is then designated as the operation target screen of the second operation 102 which is detected in the display area different from the first operation 101. The operation screen in the first display area R1 is updated in response to the first operation 101, and the operation screen in the second display area R2 is updated in response to the second operation 102.

As described above, after the first operation 101, the second operation 102 may be detected in the display area different from the first operation 101. In such a case, the continuity determining part 24 determines the continuity of the second operation 102. When determining the continuity of the second operation 102 in affirmation, the continuity determining part 24 sets the screen the same as the operation target screen of the first operation 101 as the operation target screen of the second operation 102. The operations repeatedly performed by the user to the same operation screen may be appropriately detected, and the operation screen intended by the user may be updated.

A process sequence performed at the display device 3 configured as described above is explained next. FIGS. 21 to 26 illustrate flow diagrams explaining exemplary procedures of processes performed at the display device 3. This processes are performed when the CPU 12 of the display device 3 reads and executes the program 16. The processes performed while the display area of the display unit 10 is divided into the first display area R1 and the second display area R2 are described below.

Upon the start of the process, the display device 3 brings the display controller 21 into operation to perform a screen division based on the instruction by the user (step S10). As a result, the display area of the display unit 10 is divided into the first display area R1 and the second display area R2 across the boundary BL. The position of the boundary BL may be changed freely. The display controller 21 displays the operation screen to operate the image processing function and the operation screen to operate the server function in the respective two display areas R1 and R2.

Once the screen division of the display unit 10 is performed, the display device 3 enables the operation detecting part 22 to detect the operations. The display device 3 determines if the operation start by the user is detected by the operation detecting part 22 (step S11). In response to detecting the operation start by the user (when a result of step S11 is YES), the display device 3 brings the continuity determining part 24 into operation. The continuity determining part 24 performs an operation start detection (step S12).

Figure 22:
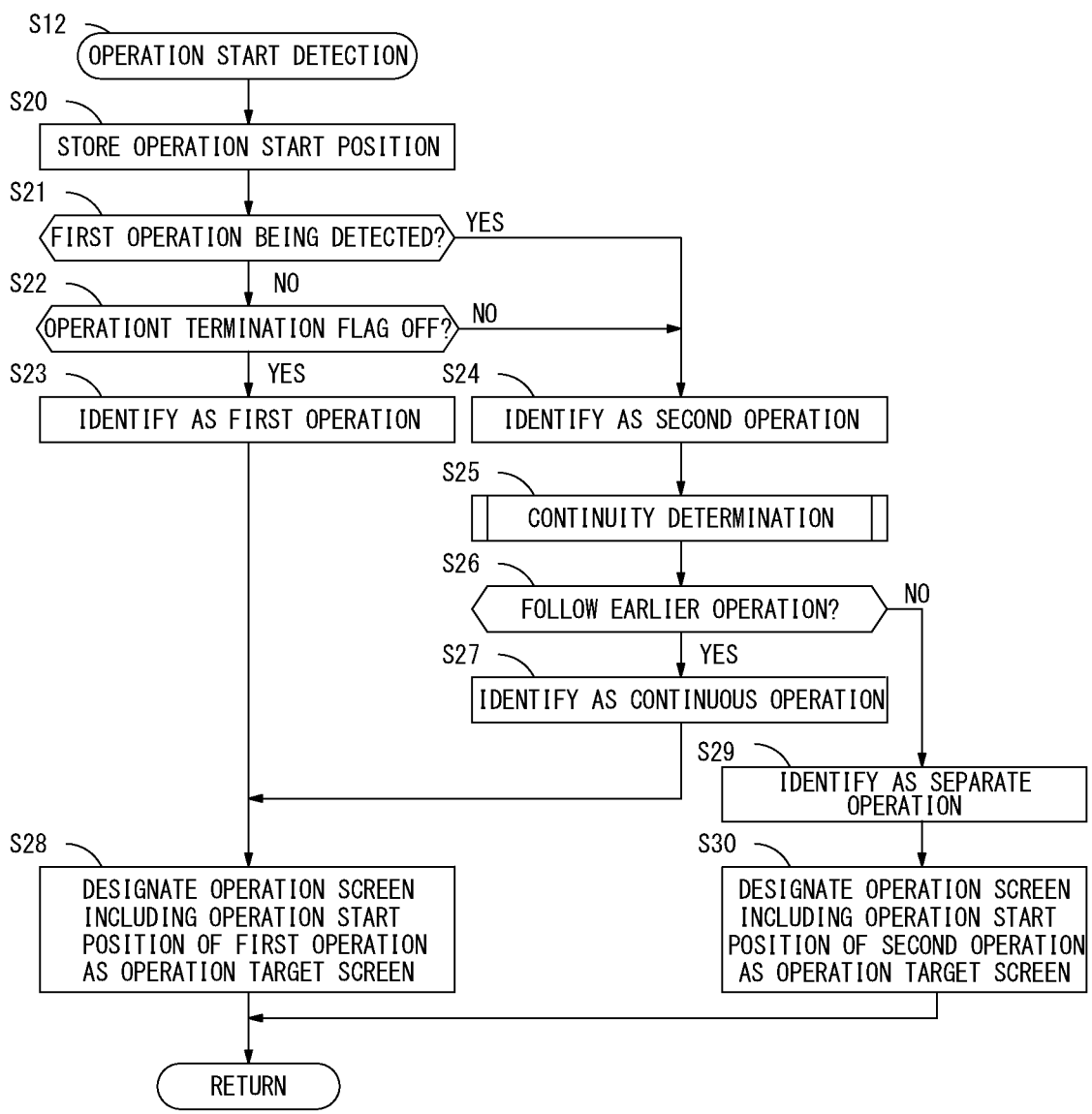
FIG. 22 illustrates a flow diagram explaining an exemplary procedure of an operation start detection in detail.

FIG. 22 illustrates a flow diagram explaining an exemplary procedure of the operation start detection (step S12) in detail. Once starting the process, the continuity determining part 24 stores the operation start position of the user (step S20). The continuity determining part 24 determines if the first operation 101 has already been detected (step S21). In step S21, when the operation termination has not been detected yet after the detection of the operation start of the first operation 101, the result is YES, and in the other cases, the result is NO. The first operation 101 may not be detected (when a result of step S21 is NO). In such a case, the continuity determining part 24 determines if an operation termination flag is off (step S22). The operation termination flag is set on upon the detection of the operation termination by the user, and is set off when the predetermined period of time is elapsed after the operation termination by the user. When the operation termination flag is off (when a result of step S22 is YES), the continuity determining part 24 identifies the operation newly detected by the operation detecting part 22 as the first operation 101 (step S23). The continuity determining part 24 designates the operation screen including the operation start position PA1 of the first operation 101 as the operation target screen of the first operation 101 (step S28).

The first operation 101 may have already been detected (when a result of step S21 is YES), or the operation termination flag may be set on (when a result of step S22 is NO). In this case, the continuity determining part 24 identifies the operation newly detected by the operation detecting part 22 as the first operation 101 (step S24). The continuity determining part 24 then performs the continuity determination to determine if the second operation 102 have the continuity with the first operation 101 (step S25).

Figure 23:
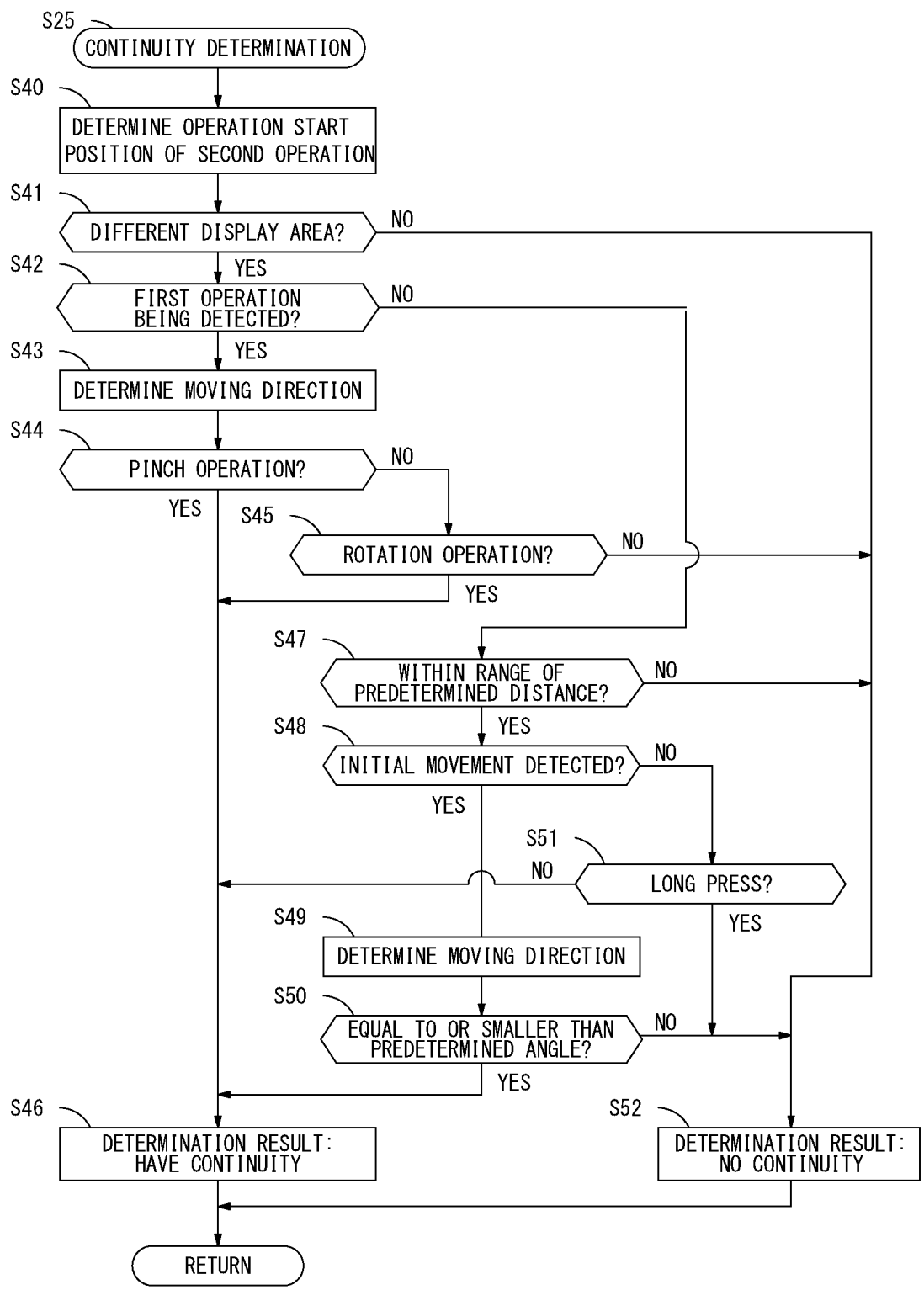
FIG. 23 illustrates a flow diagram explaining an exemplary procedure of a continuity determination in detail.

FIG. 23 illustrates a flow diagram explaining an exemplary procedure of the continuity determination (step S25) in detail. Once starting the process, the continuity determining part 24 determines the operation start position PB1 of the second operation 102 (step S40). Based on the determination result, the continuity determining part 24 determines if the operation start position PB1 of the second operation 102 is included in the display area different from which including the operation start position PA1 of the first operation 101 (step S41). The operation start position PB1 of the second operation 102 may be detected in the display area different from which including the operation start position PA1 of the first operation 101 (when a result of step S41 is YES). The continuity determining part 24 then determines the first operation 101 is still being detected (step S42). When the first operation 101 is being detected (when a result of step S42 is YES), the continuity determining part 24 determines the moving directions of the first operation 101 and the second operation 102 (step S43). The continuity determining part 24 then determines the user operation is the pinch operation (step S44). If the user operation is not the pinch operation (when a result of step S44 is NO), the continuity determining part 24 further determines if the user operation is the rotation operation (step S45). The user operation may be either of the pinch operation or the rotation operation (when a result of step S44 or S45 is YES), the continuity determining part 24 determines that the second operation 102 have the continuity with the first operation 101 (step S46).

On the other hand, the first operation 101 may have already been terminated (when a result of step S42 is NO). The continuity determining part 24 then determines if the operation start position PB1 of the second operation 102 is in the area R3 which is within the range of the predetermined distance from the operation termination position PA2 of the first operation 101 (step S47). The operation start position PB1 of the second operation 102 may be in the area R3 which is within the range of the predetermined distance from the operation termination position PA2 of the first operation 101 (when a result of step S47 is YES). In this case, the continuity determining part 24 determines if the initial movement of the second operation 102 is detected (step S48). In response to detecting the initial movement of the second operation 102 (when a result of step S48 is YES), the continuity determining part 24 determines the moving direction of the second operation 102 (step S49), and determines the first straight line L1 connecting the operation start position PA1 and the operation termination position PB2 of the first operation 101 and the second straight line L2 connecting the operation start position PB1 and the current position PB2 of the second operation 102. The continuity determining part 24 determines if the angle α formed when the first straight line L1 and the second straight line L2 cross is equal to or smaller than the predetermined angle θ (step S50). When the angle α is equal to or smaller than the predetermined angle θ (when a result of step S50 is YES), the continuity determining part 24 determines that the first operation 101 and the second operation 102 have the continuity (step S46).

The initial movement of the second operation 102 may not be detected in step S48 (when a result of step S48 is NO). In this case, the continuity determining part 24 determines whether or not the second operation 102 by the user is the long press (step S51). When the second operation 102 by the user is not the long press (when a result of step S51 is NO), the continuity determining part 24 determines that the second operation 102 and the first operation 101 have the continuity (step S46). When the second operation 102 by the user is the long press (when a result of step S51 is YES), the continuity determining part 24 determines that the content B1 selectable for the user is being selected in response to the second operation 102, and determines that the second operation 102 do not have the continuity with the first operation 101 (step S52).

The angle α may excess the predetermined angle θ in step S50 (when a result of step S50 is NO), the continuity determining part 24 determines that the first operation 101 and the second operation 102 do not have the continuity (step S52).

When determining that the second operation 102 is detected in the display area the same as the first operation 101 in step S41 (when a result of step S41 is NO), determining that the operation is not the rotation operation in step S45 (when a result of step S45 is NO), or determining that the operation start position PB1 of the second operation 102 is not in the area R3 which is within the range of the predetermined distance from the operation termination position PA2 of the first operation 101 in step S47 (when a result of step S47 is YES), the continuity determining part 24 determines that the first operation 101 and the second operation 102 do not have the continuity (step S52). Thus, the continuity determination (step S25) is complete as described above.

Referring back to FIG. 22, the continuity determining part 24 refers to the result of the continuity determination (step S25), and determines if the second operation 102 follows the first operation 101 (step S26). If the second operation 102 follows the first operation 101 (when a result of step S26 is YES), the continuity determining part 24 identifies the second operation 102 as the operation that follows the first operation 101 (step S27). The continuity determining part 24 then designates the operation screen including the operation start position PA1 of the first operation 101 as the operation target screen of the second operation 102 (step S28).

When the second operation 102 does not follow the first operation 101 (when a result of step S26 is NO), the continuity determining part 24 identifies the second operation 102 as the separate operation that does not relate to the first operation 101 (step S29). The continuity determining part 24 then designates the operation screen including the operation start position PB1 of the second operation 102 as the operation target screen of the second operation 102 (step S30). As described above, the operation start detection (step S12) is thus complete.

Referring back to FIG. 21, when the new operation start by the user is not detected by the operation detecting part 22 (when a result of step S11 is NO), the display device 3 determines whether or not the continuous operation by the user is detected by the operation detecting part 22 (step S13). When the continuous operation by the user is detected (when a result of step S13 is YES), the display device 3 brings the display controller 21 into operation. The display controller 21 then performs a continuous operation detection (step S14).

Figure 24:
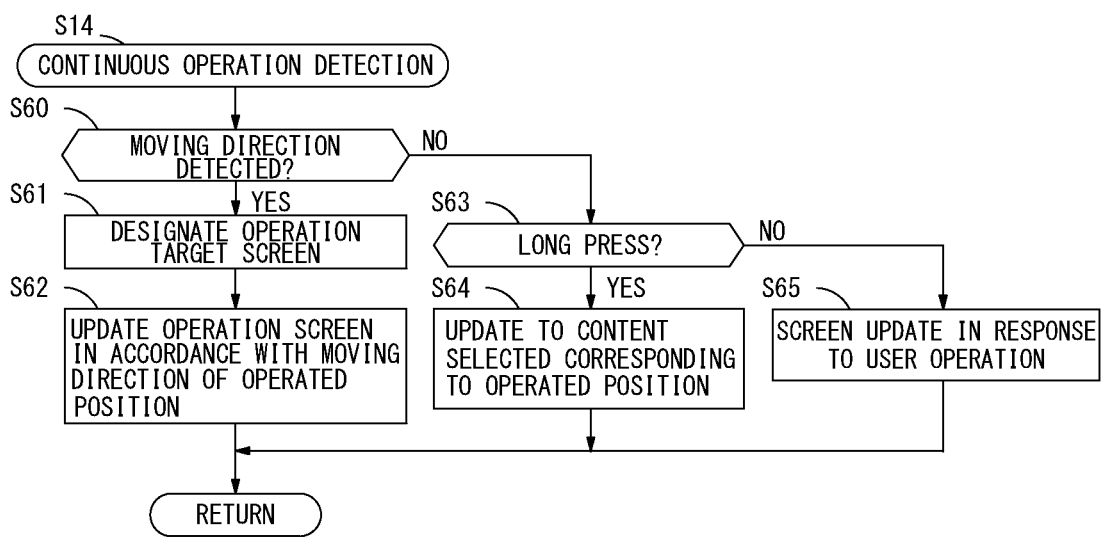
FIG. 24 illustrates a flow diagram explaining an exemplary procedure of a continuous operation detection in detail.

FIG. 24 illustrates a flow diagram explaining an exemplary procedure of the continuous operation detection (step S14) in detail. The display controller 21 determines if the moving direction of the operation continuously performed by the user (including the first operation 101 and the second operation 102) is detected (step S60). In response to detecting the moving direction (when a result of step S60 is YES), the display controller 21 identifies the moving operation is either the first operation 101 or the second operation 102, and identifies the operation target screen designated by the continuity determining part 24 (step S61). The display controller 21 then updates the operation screen in accordance with the moving direction and the moving rate of the operated position (step S62).

If the movement of the operated position is not detected (when a result of step S60 is NO), the continuity determining part 24 determines if the user operation is the long press (step S63). The user operation may be the long press (when a result of step S63 is YES). The display controller 21 then updates the screen showing that the content B1 is being selected corresponding to the operated position (step S64). If the user operation is not the long press (when a result of step S63 is NO), the display controller 21 performs the screen update in response to the user operation (step S65). Thus, the continuous operation detection (step S14) is complete as described above.

Referring back to FIG. 21, when the continuous operation by the user is not detected by the operation detecting part 22 (when a result of step S13 is NO), the display device 3 determines whether or not the operation termination by the user is detected by the operation detecting part 22 (step S15). The operation termination by the user may be detected (when a result of step S15 is YES). In such a case, the display device 3 performs the operation termination detection (step S16).

Figure 25:
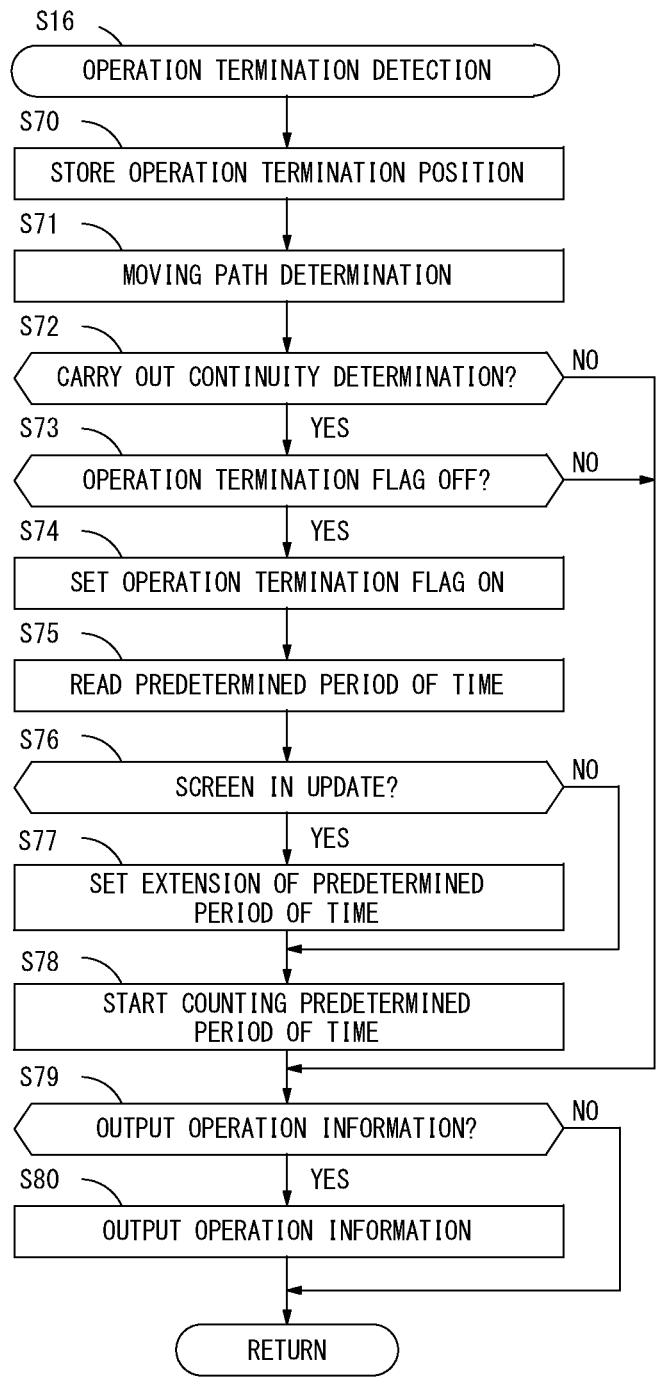
FIG. 25 illustrates a flow diagram explaining an exemplary procedure of an operation termination detection in detail.

FIG. 25 illustrates a flow diagram explaining an exemplary procedure of the operation termination detection (step S16) in detail. Upon the start of the process, the display device 3 brings the continuity determining part 24 into operation. The continuity determining part 24 stores the operation termination position operated by the user (step S70). The continuity determining part 24 calculates the moving path from the operation start position to the operation termination position of the terminated operation, also calculates the straight line connecting the operation start position and the operation termination position. The continuity determining part 24 then determines if the moving path is within the range of the predetermined distance D1 from the straight line L1 (step S71). The continuity determining part 24 determines whether or not to perform the continuity determination at the next operation based on the determination result (step S72). If the continuity determination is to be performed (when a result of step S72 is YES), the continuity determining part 24 determines if the operation termination flag is off (step S73). When the operation termination flag is off (when a result of step S73 is YES), the continuity determining part 24 sets the operation termination flag to be on (step S74). The continuity determining part 24 then reads the predetermined period of time TD (step S75). The continuity determining part 24 determines if the operation screen is in update by the display controller 21 (step S76). To be more specifically, the continuity determining part 24 determines if the update of the operation screen in response to the terminated operation is still continued. When the operation screen is in update (when a result of step S76 is YES), the continuity determining part 24 extends the predetermined period of time TD (step S77). The operation screen may not be in update (when a result of step S76 is NO), the predetermined period of time TD is not extended, and the continuity determining part 24 starts a count operation of the predetermined period of time TD (step S78). If the continuity determination is not to be performed (when a result of step S72 is NO) or the operation termination flag has already been set on (when a result of step S73 is NO), the process in the above-described steps S74 to S78 is skipped.

The display device 3 then brings the operation information outputting part 23 into operation. The operation information outputting part 23 determines if the operation information should be output to the device body 2 in response to the termination of the user operation (step S79). When the operation information should be output (when a result of step S79 is YES), the operation information outputting part 23 generates the operation information based on the user operation, and outputs the generated operation information to the device body 2 (step S80). When the operation information should not be output (when a result of step S79 is NO), the process in step S80 is skipped. Thus, the operation termination detection (step S16) is complete as described above.

Referring back to FIG. 21 again. The termination of the user operation may not be detected by the operation detecting part 22 (when a result of step S15 is NO). In this case, the display device 3 proceeds the process in the next step without performing the process in step S16. The display device 3 performs a flag process (step S17).

Figure 26:
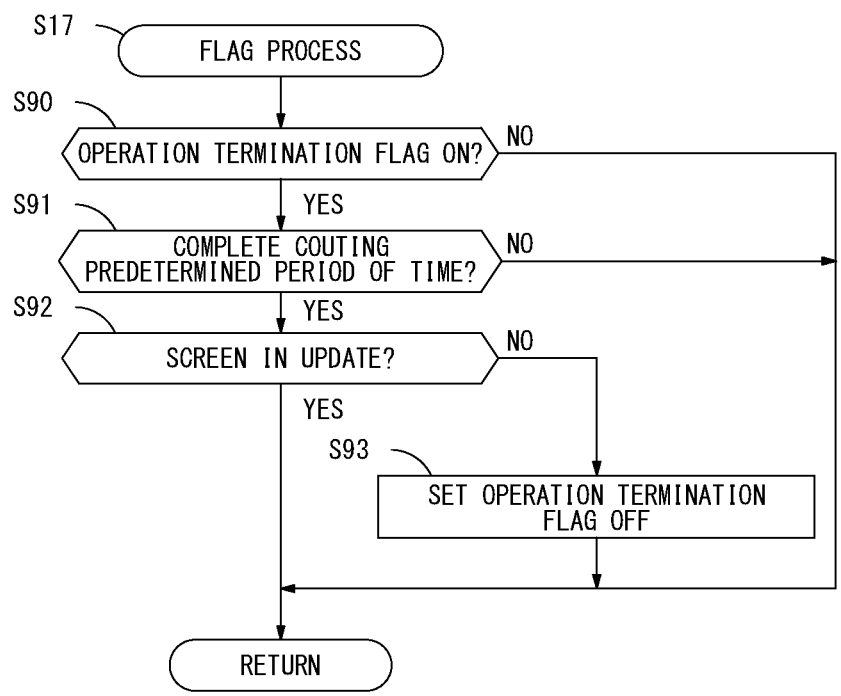
FIG. 26 illustrates a flow diagram explaining an exemplary procedure of a flag process in detail.

FIG. 26 illustrates a flow diagram explaining an exemplary procedure of the flag process (step S17) in detail. Upon the start of the process, the display device 3 brings the continuity determining part 24 into operation. The continuity determining part 24 determines if the operation termination flag is off (step S90). When the operation termination flag is off (when a result of step S90 is NO), the continuity determining part 24 completes the flag process. When the operation termination flag is on (when a result of step S90 is YES), the continuity determining part 24 determines if the counting operation of the predetermined period of time TD is complete (step S91). The counting operation of the predetermined period of time TD may not be complete (when a result of step S91 is NO). The continuity determining part 24 then completes the flag process. If the counting operation of the predetermined period of time TD is complete (when a result of step S91 is YES), the continuity determining part 24 determines if the operation screen is in update by the display controller 21 (step S92). When the operation screen is in update (when a result of step S92 is YES), the continuity determining part 24 completes the flag process. The operation screen may not be in update (when a result of step S92 is NO), the continuity determining part 24 sets the operation termination flag off (step S93). Thus, the flag process (step S17) is complete as described above.

Referring back to FIG. 21 again. The display device 3 determines whether or not to complete the screen division (step S18). The display device 3, for example, determines whether or not the termination of the screen division is given by the user. When the screen division is not going to be terminated (when a result of step S18 is NO), the display device 3 returns to step S11 to repeatedly perform the above-described process. As a result, every time the user performs the touch operation to the display screen of the display unit 10, it is determined whether or not the touch operation follows the earlier operation, and the operation screen the same as the operation screen updated in response to the earlier operation is updated when the touch operation follows the earlier operation. In response to determining to terminate the screen division (when a result of step S18 is YES), the display device 3 completes the whole process.

As described above, the image processing device 1 of the present invention enables the display device 3 to display the operation screen for the user to operate the image processing function and the operation screen for the user to operate the server function at the same time. The display device 3 displays the first display area R1 and the second display area R2 across the boundary BL on the display unit 10. The second operation 102 may be detected by the operation detecting part 22 in the second display area R2 after the first operation 101 is detected in the first display area R1. The display device 3 then determines if the second operation 102 and the first operation 101 have the continuity. After determining that the second operation 102 and the first operation 101 have the continuity, the display device 3 updates the operation screen in the first display area R1 in response to the second operation 102. When determining that the second operation 102 and the first operation 101 do not have the continuity, the display device 3 updates the operation screen in the second display area R2 in response to the second operation 102.

The above-described display device 3 enables to reduce situations that the operation screen not intended by the user is updated and to improve operability. It is assumed, for example, the user moves the operated position of the touch operation in the horizontal direction in order to scroll the operation screen displayed in the first display area R1 in the horizontal direction. Even when the operated position enters the second display area R2 across the boundary, the scroll display of the operation screen in the first display area R1 may be continued. The user may once leave the finger tip from the operation screen in the second display area R2, and start again the operation to the same operation screen. Even in such a case, the display device 3 may update the operation screen in the first display area R1 in response to the user operation. More specifically, the above-described display device 3 may detect the continuous operations performed to the same operation screen by the user, and update the operation screen intended by the user appropriately in response to the continuous operations.

As described above, the user operations continuously performed to the same operation screen may be detected appropriately while the multiple display screens are displayed, and update of the operation screen intended by the user in response to the continuous operations by the user may be carried out.

Although the embodiment of the present invention has been described and illustrated in detail, it is clearly understood that the same is by way of illustration and example only and not limitation, the scope of the present invention should be interpreted by terms of the appended claims.

Modifications

While the preferred embodiment of the present invention has been described above, the present invention is not limited to the preferred embodiment. Various modifications may be applied to the present invention.

In the above-described preferred embodiment, for example, the left side area is stated as the first display area R1 and the right side area is stated as the second display area R2 as the screen of the display unit 10 is divided to right and left. However, this is given not for limitation. The right side area may be the first display area R1 and the left side area may be the second display area R2. The screen may be divided in the horizontal direction but may be divided in the vertical direction.

In the above-described preferred embodiment, the display device 3 is provided as the user interface of the image processing device 1. The display device 3 does not always have to be provided as the user interface of the image processing device 1. The display device 3 may be provided as the display device such as the personal computer (PC), for instance. The display device 3 may be a portable terminal device such as a smartphone or a tablet terminal.

The above-described program 16 is installed in advance in the display device 3. The program 16 does not always have to be installed in advance in the display device 3. The program 16 itself may be the target of trading. In such a case, the program 16 may be provided with the display device 3 in a manner that the user downloads over the internet, or may be provided with the display device 3 in a manner that is recorded on a computer readable recording medium such as a CD-ROM.

What is claimed is:

1. A display device, comprising:
   a display part that displays a first display area and a second display area across a boundary and displays operation screens in the respective first and second display areas;
   a manipulation part that detects a user operation performed to a display screen of said display part; and
   a hardware processor that:
   determines whether or not a first operation and a second operation have continuity when said second operation is detected in said second display area by said manipulation part after said first operation is detected in said first display area by said manipulation part, an operated position of said first operation moves to said second display area across said boundary, and operation termination of said first operation is detected in said second display area by said manipulation part; and
   updates the operation screen in said first display area in response to said second operation when said first operation and said second operation are determined to have continuity, and updates the operation screen in said second display area in response to said second operation when said first operation and said second operation are determined not to have continuity.

2. The display device according to claim 1, wherein said hardware processor determines said first operation in said second display area is to operate said first display area when said operated position of said first operation moves to said second display area across said boundary.

3. The display device according to claim 1, wherein said hardware processor determines that said second operation and said first operation have continuity when said second operation is detected within a predetermined period of time after detection of the operation termination of said first operation.

4. The display device according to claim 3, wherein said hardware processor extends said predetermined period of time when an update of the operation screen in said first display area in response to said first operation is continued after the detection of the operation termination of said first operation.

5. The display device according to claim 1, wherein said hardware processor determines that said second operation and said first operation have continuity when said second operation is detected within a range of a predetermined distance from an operation termination position of said first operation after the detection of the operation termination of said first operation.

6. The display device according to claim 1, wherein said hardware processor detects an angle formed by a first straight line connecting an operation start position and the operation termination position of said first operation and a second straight line connecting an operation start position and a current position of said second operation after the detection of the operation termination of said first operation, and when the formed angle is equal to or smaller than a predetermined angle, said second operation and said first operation determined to have continuity.

7. The display device according to claim 1, wherein said hardware processor determines that said second operation in said first display area is to operate said first display area when the operated position of said second operation moves to said first display area across said boundary after determining that said second operation and said first operation have continuity.

8. The display device according to claim 1, wherein said hardware processor determines that said second operation and said first operation do not have continuity when a content operable for the user is displayed at the operation start position of said second operation and said second operation is a long press operation.

9. The display device according to claim 1, wherein said hardware processor does not determine the continuity even when said second operation is detected in said second display area after said first operation if a moving path between the operation start position and the operation termination position of said first operation is not in a range of a predetermined distance from a straight line connecting the operation start position and the operation termination position of said first operation.

10. The display device according to claim 1, wherein said hardware processor further determines whether or not a third operation and said first operation have continuity when said third operation is detected by said manipulation part while said second operation determined as the operation that follows said first operation is continued.

11. The display device according to claim 1, wherein said hardware processor determines whether or not said second operation and said first operation have continuity based on a moving direction of the operated position of said first operation and a moving direction of the operated position of said second operation when said second operation is detected in said second display area prior to the detection of the operation termination of said first operation.

12. An image processing device, comprising:
a display device according to claim 1; and
a hardware processor that:
outputs a job setting screen for configuring job settings to said display device, and displays in at least one of a first display area and a second display area;
obtains operation information regarding an operation to said job setting screen from said display device and applies the job settings; and
controls an execution of the job based on the job settings.

13. A non-transitory recording medium storing a computer readable program to be executed by a hardware processor in a display part that includes a display part that displays a first display area and a second display area across a boundary and displays operation screens in the respective first and second display areas; and a manipulation part that detects a user operation performed to a display screen of said display part, execution of the computer readable program by said hardware processor in said display device causing said hardware processor to perform:
determining whether or not a first operation and a second operation have continuity when said second operation is detected in said second display area by said manipulation part after said first operation is detected in said first display area by said manipulation part, an operated position of said first operation moves to said second display area across said boundary, and operation termination of said first operation is detected in said second display area by said manipulation part; and
updating the operation screen in said first display area in response to said second operation when said first operation and said second operation are determined to have continuity, and updates the operation screen in said second display area in response to said second operation when said first operation and said second operation are determined not to have continuity.

14. The non-transitory recording medium according to claim 13, wherein
said first operation in said second display area is determined as an operation to operate said first display area when said operated position of said first operation moves to said second display area across said boundary.

15. The non-transitory recording medium according to claim 13, wherein
said second operation and said first operation are determined to have continuity when said second operation is detected within a predetermined period of time after detection of the operation termination of said first operation.

16. The non-transitory recording medium according to claim 13, wherein
said predetermined period of time is extended when an update of the operation screen in said first display area in response to said first operation is continued after the detection of the operation termination of said first operation.

17. The non-transitory recording medium according to claim 13, wherein
said second operation and said first operation are determined to have continuity when said second operation is detected within a range of a predetermined distance from an operation termination position of said first operation after the detection of the operation termination of said first operation.

18. The non-transitory recording medium according to claim 13, wherein
an angle formed by a first straight line connecting an operation start position and the operation termination position of said first operation and a second straight line connecting an operation start position and a current position of said second operation is detected after the detection of the operation termination of said first operation, and when the formed angle is equal to or smaller than a predetermined angle, said second operation and said first operation determined to have continuity.

19. The non-transitory recording medium according to claim 13, wherein
said second operation in said first display area is determined as the operation to operate said first display area when the operated position of said second operation moves to said first display area across said boundary after said second operation and said first operation are determined to have continuity.

20. The non-transitory recording medium according to claim 13, wherein
said second operation and said first operation are determined not to have continuity when a content operable for the user is displayed at the operation start position of said second operation and said second operation is a long press operation.

21. The non-transitory recording medium according to claim 13, wherein
the continuity is not determined even when said second operation is detected in said second display area after said first operation if a moving path between the operation start position and the operation termination position of said first operation is not in a range of a predetermined distance from a straight line connecting the operation start position and the operation termination position of said first operation.

22. The non-transitory recording medium according to claim 13, wherein
whether or not a third operation and said first operation have continuity is determined when said third operation is detected by said manipulation part while said second operation determined as the operation that follows said first operation is continued.

23. The non-transitory recording medium according to claim 13, wherein
whether or not said second operation and said first operation have continuity is determined based on a moving direction of the operated position of said first operation and a moving direction of the operated position of said second operation when said second operation is detected in said second display area prior to the detection of the operation termination of said first operation.

* * * * *